(12) United States Patent
Seok

(10) Patent No.: US 9,854,606 B2
(45) Date of Patent: Dec. 26, 2017

(54) METHOD AND APPARATUS FOR UPLINK CHANNEL ACCESS IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 139 days.

(21) Appl. No.: 14/885,881

(22) Filed: Oct. 16, 2015

(65) Prior Publication Data

US 2016/0113034 A1 Apr. 21, 2016

Related U.S. Application Data

(60) Provisional application No. 62/064,785, filed on Oct. 16, 2014, provisional application No. 62/069,662, filed on Oct. 28, 2014, provisional application No. 62/083,855, filed on Nov. 24, 2014.

(51) Int. Cl.
*H04L 12/26* (2006.01)
*H04W 74/04* (2009.01)
*H04W 84/12* (2009.01)

(52) U.S. Cl.
CPC ............ *H04W 74/04* (2013.01); *H04W 84/12* (2013.01)

(58) Field of Classification Search
CPC .............................. H04W 74/04; H04W 84/12
See application file for complete search history.

(56) References Cited

U.S. PATENT DOCUMENTS

| | | | |
|---|---|---|---|
| 2007/0147284 A1* | 6/2007 | Sammour | H04J 3/0605 370/328 |
| 2013/0301502 A1* | 11/2013 | Kwon | H04W 52/0206 370/311 |
| 2015/0063190 A1* | 3/2015 | Merlin | H04L 5/0037 370/312 |

* cited by examiner

*Primary Examiner* — Afshawn Towfighi

(57) ABSTRACT

The present disclosure relates to a method and apparatus for uplink channel access in a High Efficiency WLAN (HEW). According to one aspect, a method for transmitting an uplink frame by a station (STA) to an access point (AP) in a wireless local area network may be provided. The method may include receiving from the AP a trigger frame for eliciting an uplink transmission from the STA, transmitting to the AP the uplink frame according to a type of the trigger frame, wherein when the uplink frame is transmitted in an uplink multiple user (MU) transmission, the uplink frame includes a padding added by the STA such that transmissions from a plurality of STAs including the STA in the uplink MU transmission end at a same time indicated by the trigger frame, and receiving from the AP a frame in response to the uplink MU transmission a predetermined time after an end of the uplink MU transmission.

17 Claims, 24 Drawing Sheets

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3,STA4) |
| | | | | HE-STF | HE-LTF | HE-LTF | HE-LTF | HE-LTF | HE-SIG-B | PSDU(AP to STA1,STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-SIG-C | PSDU(AP to STA1, STA2) |

FIG. 13

| L-STF | L-LTF | L-SIG | HE-SIG-A | HE-STF | HE-LTF | HE-SIG-B | HE-LTF | HE-LTF | HE-LTF | HE-SIG-C | PSDU(STA4 to AP) |
|-------|-------|-------|----------|--------|--------|----------|--------|--------|--------|----------|------------------|
| | | | | HE-STF | HE-LTF | HE-SIG-B | HE-LTF | HE-LTF | HE-LTF | HE-SIG-C | PSDU(STA3 to AP) |
| | | | | HE-STF | HE-LTF | HE-SIG-B | HE-LTF | HE-LTF | HE-LTF | HE-SIG-C | PSDU(STA2 to AP) |
| | | | | HE-STF | HE-LTF | HE-SIG-B | HE-LTF | HE-LTF | HE-LTF | HE-SIG-C | PSDU(STA1 to AP) |

METHOD AND APPARATUS FOR UPLINK CHANNEL ACCESS IN A HIGH EFFICIENCY WIRELESS LAN

This application claims the benefits of U.S. Provisional Application No. 62/064,785, filed on Oct. 16, 2014, U.S. Provisional Application No. 62/069,662, filed on Oct. 28, 2014, and U.S. Provisional Application No. 62/083,855, filed on Nov. 24, 2014, which are hereby incorporated by reference as if fully set forth herein.

BACKGROUND

Technical Field

The present disclosure relates to a Wireless Local Area Network (WLAN), and more particularly, to a method, apparatus, and software for uplink channel access in a High Efficiency WLAN (HEW), and a recording medium that stores the software.

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for uplink channel access in a HEW.

SUMMARY

Objects of the present disclosure is to provide a method and apparatus for uplink channel access in a High Efficiency WLAN (HEW).

The objects of the present disclosure are not limited to the foregoing descriptions, and additional objects will become apparent to those having ordinary skill in the pertinent art to the present disclosure based upon the following descriptions.

In an aspect of the present disclosure, a method for transmitting an uplink frame by a station (STA) to an access point (AP) in a wireless local area network may be provided. The method may include receiving from the AP a trigger frame for eliciting an uplink transmission from the STA, transmitting to the AP the uplink frame according to a type of the trigger frame, wherein when the uplink frame is transmitted in an uplink multiple user (MU) transmission, the uplink frame includes a padding added by the STA such that transmissions from a plurality of STAs including the STA in the uplink MU transmission end at a same time indicated by the trigger frame, and receiving from the AP a frame in response to the uplink MU transmission a predetermined time after an end of the uplink MU transmission.

In another aspect of the present disclosure, a method for receiving an uplink transmission by an AP in a wireless local area network may be provided. The method may include transmitting a trigger frame for eliciting the uplink transmission from one or more STAs, receiving from the one or more STAs the uplink transmission according to a type of the trigger frame, wherein when the uplink transmission is an uplink MU transmission, each of at least one uplink frame includes a padding added by a STA of a plurality of STAs such that transmissions from the plurality of STAs in the uplink MU transmission end at a same time indicated by the trigger frame, and transmitting a frame in response to the uplink MU transmission a predetermined time after an end of the uplink MU transmission.

In another aspect of the present disclosure, an STA apparatus for transmitting an uplink frame to an AP in a wireless local area network may be provided. The STA apparatus may include a baseband processor, a Radio Frequency (RF) transceiver, a memory, etc. The baseband processor may be configured to receive from the AP a trigger frame for eliciting an uplink transmission from the STA using the transceiver, to transmit to the AP the uplink frame according to a type of the trigger frame using the transceiver, wherein when the uplink frame is transmitted in an uplink MU transmission, the uplink frame includes a padding added by the STA such that transmissions from a plurality of STAs including the STA in the uplink MU transmission end at a same time indicated by the trigger frame, and to receive from the AP a frame using the transceiver in response to the uplink MU transmission a predetermined time after an end of the uplink MU transmission.

In another aspect of the present disclosure, an AP apparatus for receiving an uplink transmission in a wireless local area network may be provided. The AP apparatus may include a baseband processor, an RF transceiver, a memory, etc. The baseband processor may be configured to transmit a trigger frame for eliciting the uplink transmission from one or more STAs using the transceiver, to receive from the one or more STAs the uplink transmission according to a type of the trigger frame using the transceiver, wherein when the uplink transmission is an uplink MU transmission, each of at least one uplink frame includes a padding added by a STA of a plurality of STAs such that transmissions from the plurality of STAs in the uplink MU transmission end at a same time indicated by the trigger frame, and to transmit a frame in response to the uplink MU transmission using the transceiver a predetermined time after an end of the uplink MU transmission.

In another aspect of the present disclosure, a software or computer-readable medium having instructions executable for an STA to transmit an uplink frame to an AP in a wireless local area network may be provided. The executable instructions may cause the STA to receive from the AP a trigger frame for eliciting an uplink transmission from the STA to transmit to the AP the uplink frame according to a type of the trigger frame, wherein when the uplink frame is transmitted in an uplink MU transmission, the uplink frame includes a padding added by the STA such that transmissions from a plurality of STAs including the STA in the uplink MU transmission end at a same time indicated by the trigger frame, and to receive from the AP a frame in response to the uplink MU transmission a predetermined time after an end of the uplink MU transmission.

In another aspect of the present disclosure, a software or computer-readable medium having instructions executable for an AP to receive an uplink transmission in a wireless local area network may be provided. The executable instructions may cause the AP a memory, etc. The baseband processor may be configured to transmit a trigger frame for eliciting the uplink transmission from one or more STAs, to receive from the one or more STAs the uplink transmission according to a type of the trigger frame, wherein when the uplink transmission is an uplink MU transmission, each of at least one uplink frame includes a padding added by a STA of a plurality of STAs such that transmissions from the plurality of STAs in the uplink MU transmission end at a same time indicated by the trigger frame, and to transmit a frame in response to the uplink MU transmission a predetermined time after an end of the uplink MU transmission.

It is to be understood that both the foregoing summarized features are exemplary aspects of the following detailed description of the present disclosure without limiting the scope of the present disclosure.

According to the present disclosure, a method and apparatus for uplink channel access in a HEW can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of an High Efficiency Long Training Field (HE-LTF) field in a HE PPDU frame format according to the present disclosure;

FIG. 12 depicts a High Efficiency SIGnal B (HE-SIG-B) field and a High Efficiency SIGnal C (HE-SIG-C) field in the HE PPDU frame format according to the present disclosure;

FIG. 13 depicts another example of a HE PPDU frame format according to the present disclosure;

DETAILED DESCRIPTION

Figure 1:
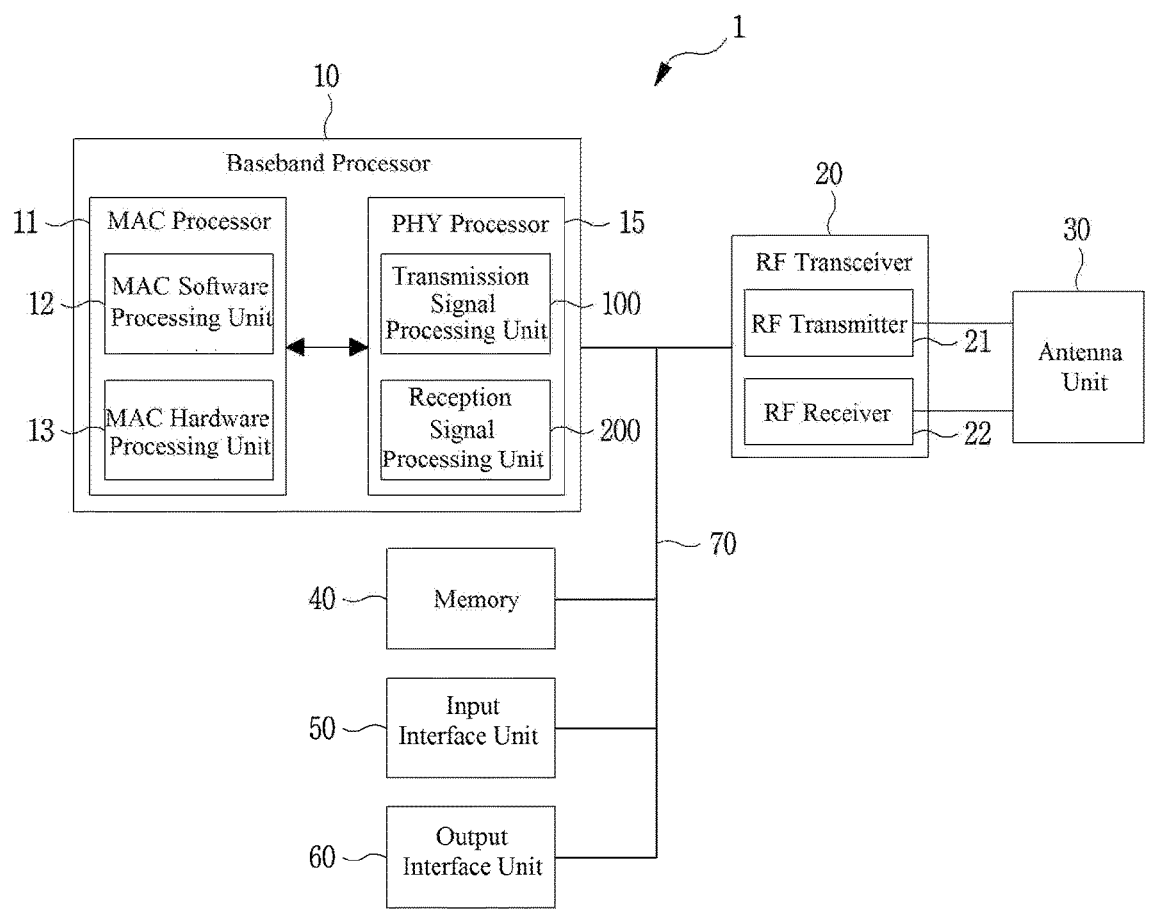
FIG. 1 is a block diagram of a Wireless Local Area Network (WLAN) device.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer in hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
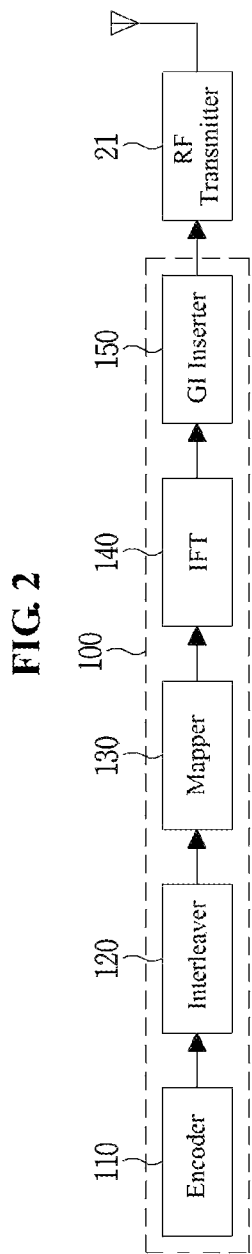
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
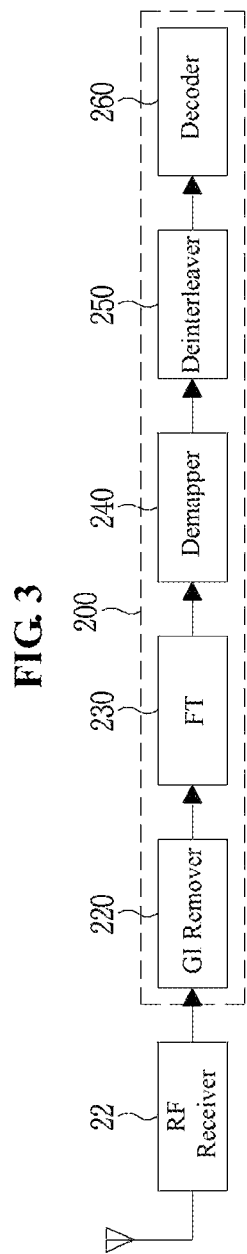
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
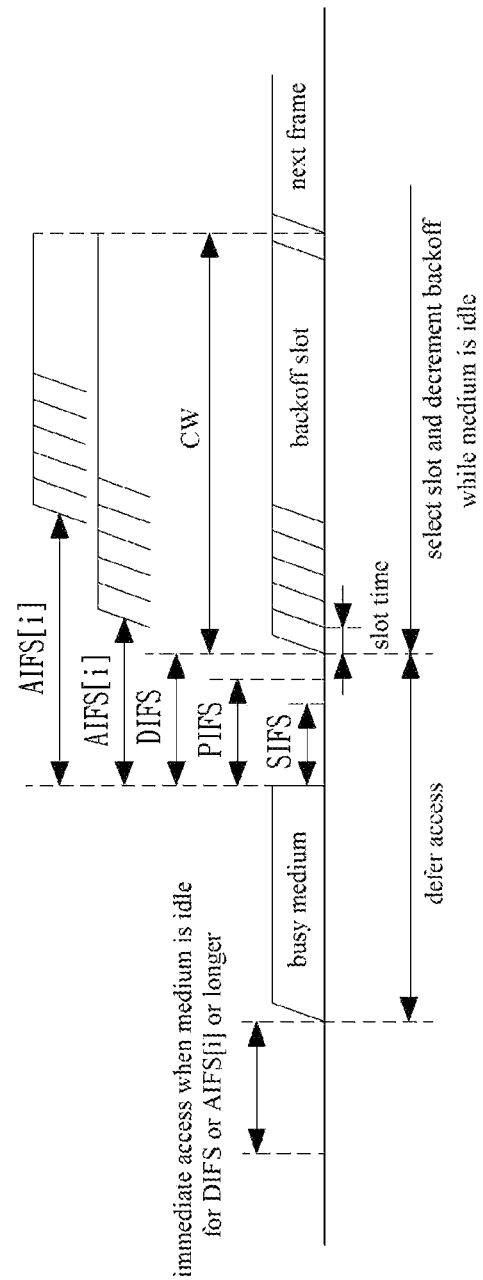
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
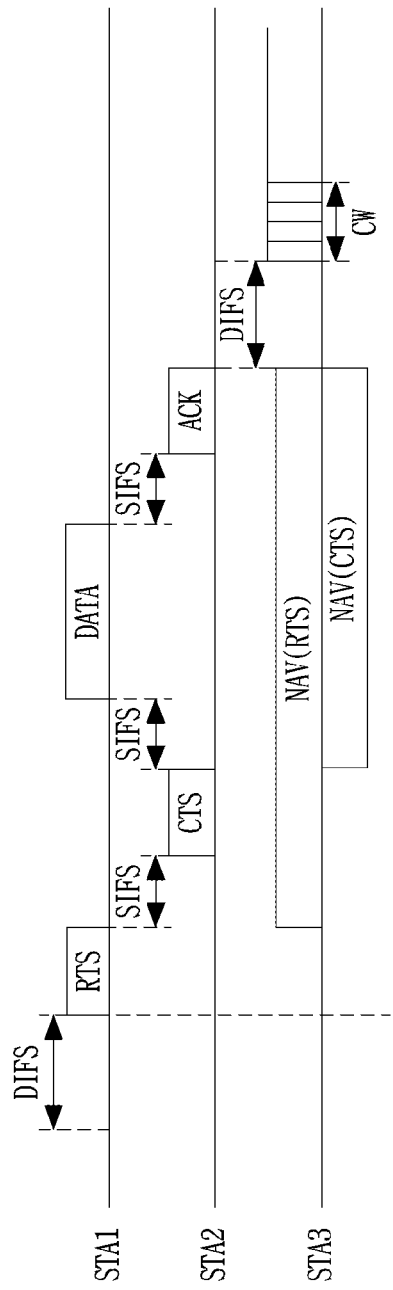
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
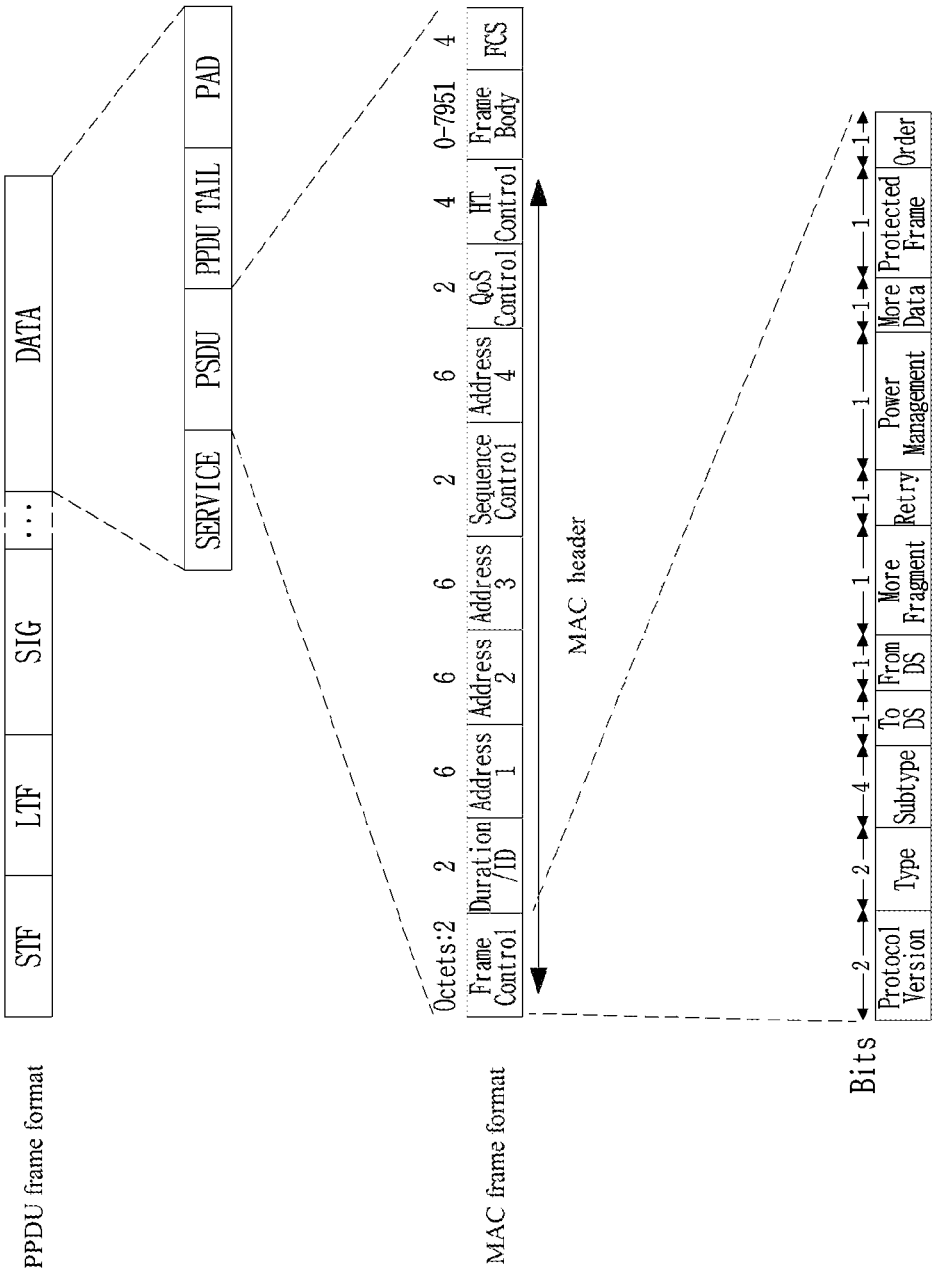
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
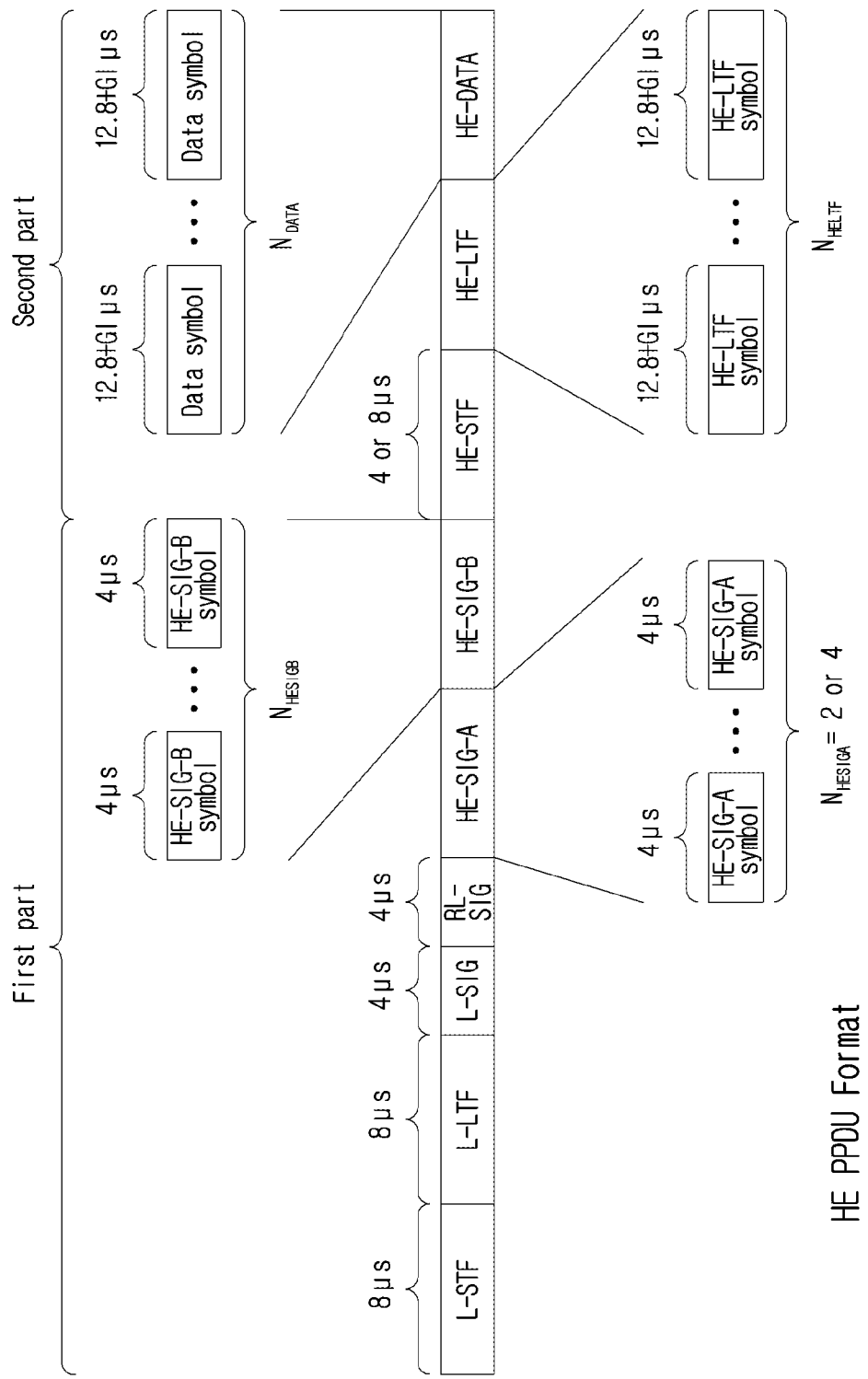
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may detect a PPDU and then process the PPDU.

The HE PPDU frame format may broadly include two parts: the first part including an L-STF field, an L-LTF field, an L-SIG field, an RL-SIG field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table 1.

TABLE 1

| Element | definition | duration | DFT period | GI | Subcarrier spacing | Description |
|---|---|---|---|---|---|---|
| Legacy(L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |

TABLE 1-continued

| Element | definition | duration | DFT period | GI | Subcarrier spacing | Description |
|---|---|---|---|---|---|---|
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is a HE SIGNAL A field and may have a duration of $N_{HESIGA}$*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}$*4 μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}$*(DFT period+GI)μs. $N_{HELTF}$ represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 µs excluding a GI and then eliminating the first half or the second half of the OFDM symbol in the time domain. In the 4×LTF mode, a HE-LTF symbol excluding a GI are equivalent to a symbol obtained by modulating every fourth tone in an OFDM symbol of 12.8 µs excluding a GI and then eliminating the first three-fourths or the last three-fourths of the OFDM symbol in the time domain. 2×LTF may have a DFT period of 6.4 µs and 4×LTF may have a DFT period of 12.8 µs. A GI of HE-LTF may support 0.8 µs, 1.6 µs, and 3.2 µs. 2×LTF may have a subcarrier spacing equivalent to 156.25 kHz and 4×LTF may have a subcarrier spacing of 78.125 kHz.

HE-DATA is a HE DATA field and may have a duration of, $N_{DATA}*(DFT\ period+GI)$µs. $N_{DATA}$ represents the number of HE-DATA symbols. HE-DATA may have a DFT period of 12.8 µs. A GI of HE-DATA may support 0.8 µs, 1.6 µs, and 3.2 µs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
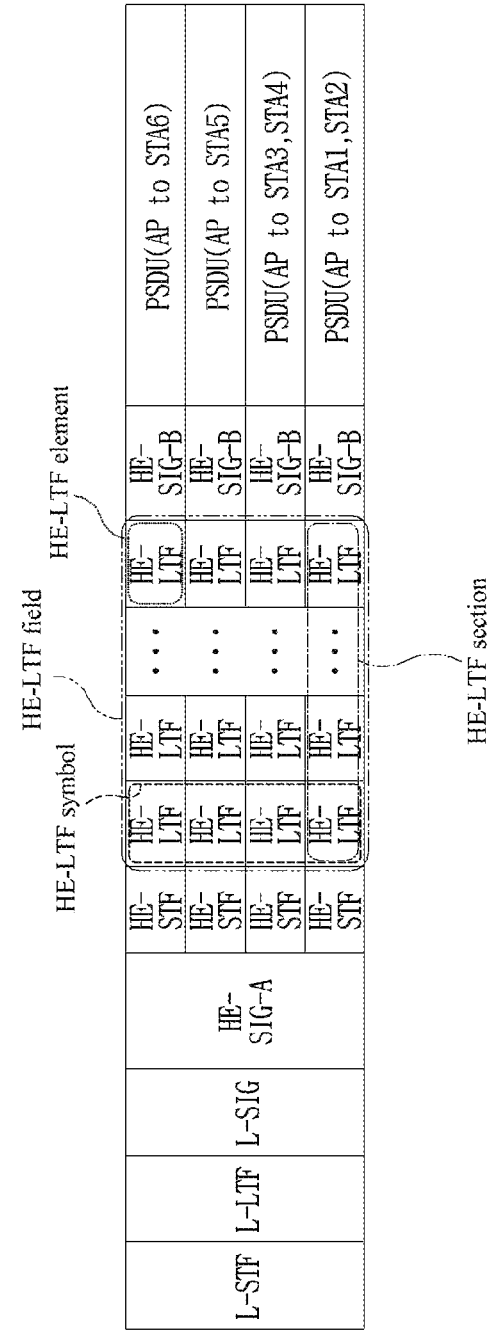
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 2] below, to ensure backward compatibility with legacy STAs (e.g., IEEE 802.11ac stations).

TABLE 2

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |

TABLE 2-continued

| Two parts of VHT-SIG-A | Bit | Field | Number of bits | Description |
|---|---|---|---|---|
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>  Set to 0 for 0 space-time streams<br>  Set to 1 for 1 space-time stream<br>  Set to 2 for 2 space-time streams<br>  Set to 3 for 3 space-time streams<br>  Set to 4 for 4 space-time streams<br>  Values 5-7 are reserved<br>For a VHT SU PPDU:<br>B10-B12<br>  Set to 0 for 1 space-time stream<br>  Set to 1 for 2 space-time streams<br>  Set to 2 for 3 space-time streams<br>  Set to 3 for 4 space-time streams<br>  Set to 4 for 5 space-time streams<br>  Set to 5 for 6 space-time streams<br>  Set to 6 for 7 space-time streams<br>  Set to 7 for 8 space-time streams<br>B13-B21<br>  Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Ser to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>  VHT-MCS index<br>For a VHT MU PPDU:<br>  If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>  If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>  If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1.<br>  B7 is reserved and set to 1 |
| | B8 | Beamformed | 1 | For a VHT SU PPDU:<br>  Set to 1 if a Beamforming steering matrix is applied to the waveform in an SU transmission as described in 20.3.11.11.2. set to 0 otherwise.<br>For a VHT MU PPDU:<br>  Reserved and set to 1<br>NOTE-If equal to 1 smoothing is not recommended. |

TABLE 2-continued

| Two parts of VHT-SIG-A | Bit | Field | Number of bits | Description |
| --- | --- | --- | --- | --- |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0.23 of VHT-SIG-A1 and bits 0-9 of VHT-SIG-A2, respectively. |
| | B18-B23 | Tail | 6 | Used to terminate the trellis of the convolutional decoder. Set to 0. |

[Table 2] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present disclosure, the HE-SIG-A field may include one or more of the fields included in the VHT-SIG-A field, and it may provide backward compatibility with IEEE 802.11ac stations.

Figure 9:
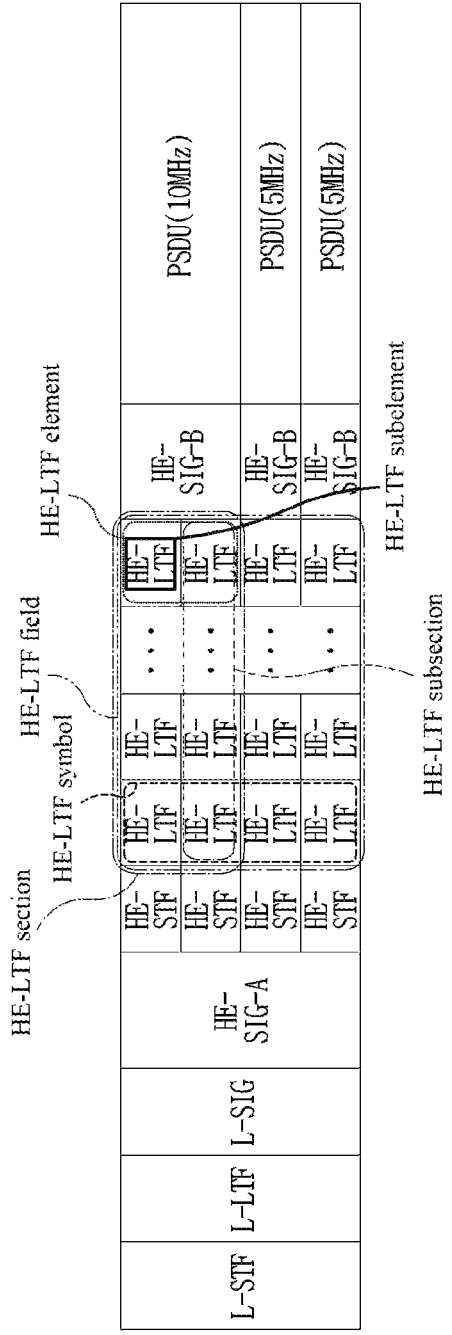
FIG. 9 depicts subchannel allocation in a HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
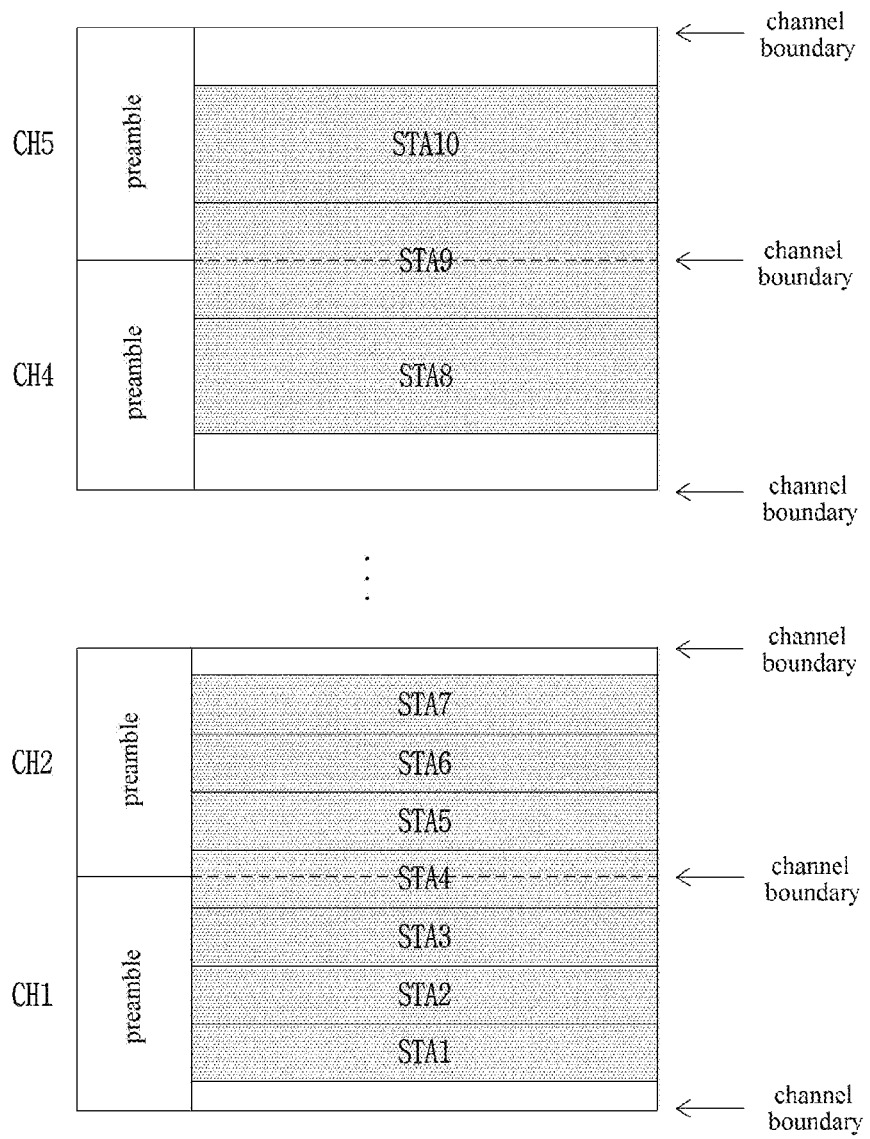
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present disclosure, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present disclosure, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present disclosure, relationship between a total number of spatial streams transmitted on one subchannel and a number of HE-LTFs is listed in [Table 3].

TABLE 3

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 3], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 11 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 12 depicts a HE-SIG-B field and a HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

With reference to the foregoing examples of the present disclosure, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to each HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 13 may be used for a UL HE PPDU transmission.

FIG. 13 depicts another exemplary HE PPDU frame format according to the present disclosure. The HE PPDU frame format illustrated in FIG. 13 is characterized in that a structure of HE-SIG-A, HE-SIG-B, and HE-SIG-C fields similar to in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 13 may not exist. In this case, a description of each field given below may be applied only in the presence of the field.

In the example of FIG. 13, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Now, a description will be given below of a UL MU transmission method according to the present disclosure. For example, specific examples of triggering for UL MU transmission, a transmission time of a UL MU PPDU, an ACK for UL MU transmission, error recovery for UL MU transmission, and UL MU triggering supporting random access for UL MU transmission will be described.

UL MU-MIMO transmission is taken as an example of UL MU transmission in the following examples of the present disclosure. However, the examples of the present disclosure is also applicable in the same manner to UL OFDMA transmission in which one transmission channel is divided into a plurality of subchannels and each STA performs simultaneous UL transmission on an allocated subchannel. That is, UL MU transmission includes UL MU-MIMO transmission or UL OFDMA transmission in the following description.

Figure 14:
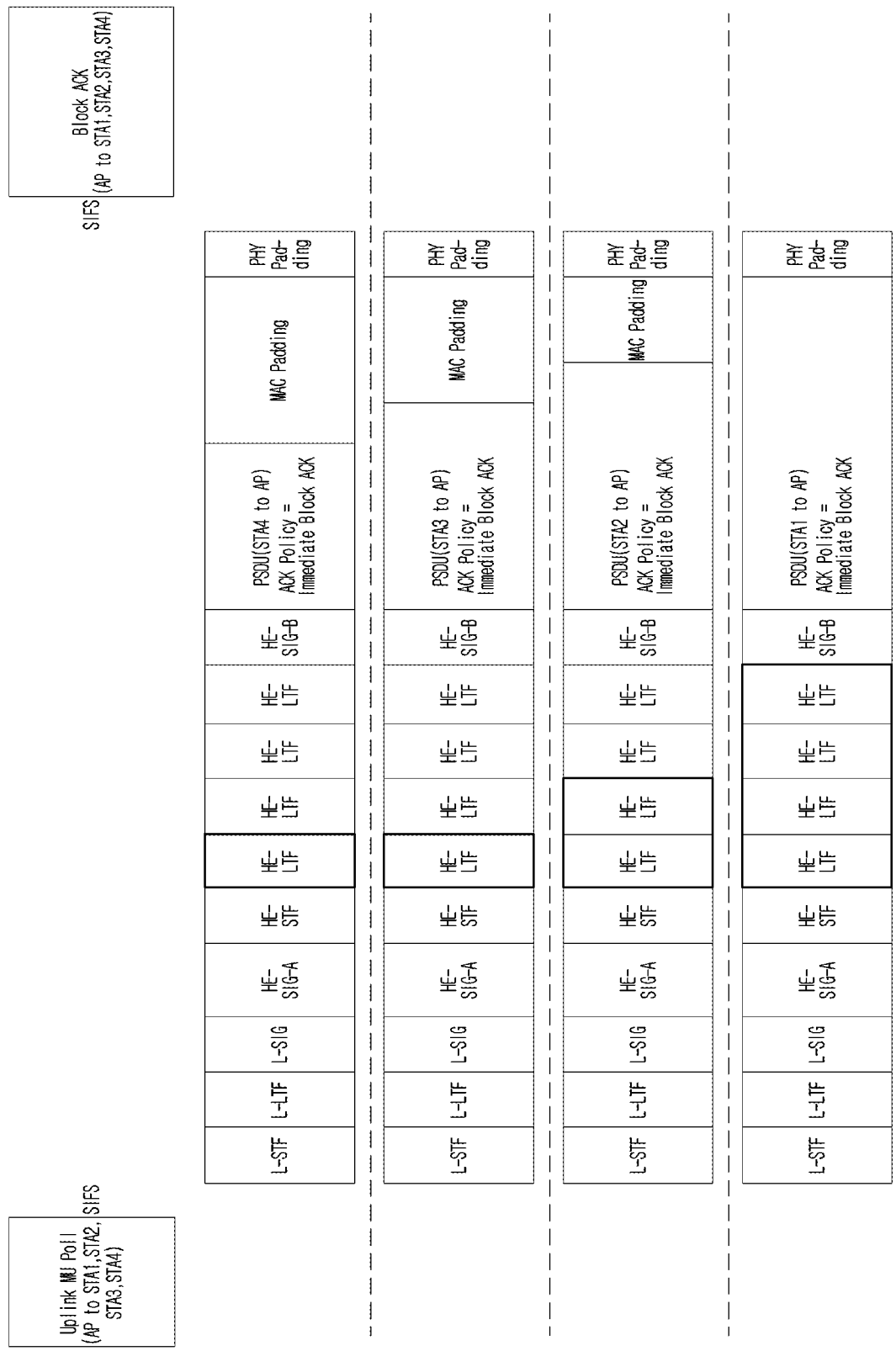
FIGS. 14 to 17 depict exemplary frame exchange sequences each including Uplink (UL) Multi-User (MU) transmission according to the present disclosure.

FIG. 14 depicts an exemplary frame exchange sequence including UL MU transmission according to the present disclosure.

The AP may transmit a poll frame for UL MU transmission (i.e., a UL MU trigger frame) to STAs to which UL MU transmission has been granted or requested. To request UL MU transmission from STA1, STA2, STA3, and STA4, the AP may transmit a UL MU Poll frame to STA1, STA2, STA3, and STA4. The UL MU poll frame directed to the plurality of STAs may include Receiver Address (i.e., an Address 1 field in a MAC header) set to a broadcast address, Transmitter Address (i.e., an Address 2 field in the MAC header) set to the MAC address of the AP, Basic Service Set Identifier (BSSID), and payload with IDs (e.g., Association Identifiers (AIDs) of the STAs requested to perform the UL MU transmission. The UL MU Poll frame may further include information about a transmission time (length) of a UL MU PPDU to be transmitted simultaneously by the STAs.

Upon receipt of the UL MU Poll frame (i.e., a poll frame triggering UL MU transmission (UL MU-MIMO transmission or UL OFDMA transmission)), the STAs may determine whether they are requested for the UL MU transmission based on information included in the UL MU Poll frame (e.g., UL MU triggering information). If an STA determines that it is requested for the UL MU transmission, the STA may transmit a UL MU PPDU to the AP during a given time period indicated by the information about the transmission time of the UL MU PPDU (i.e., UL MU-MIMO PPDU or UL OFDMA PPDU), included in the UL MU Poll frame.

To align the transmission times of the UL MU PPDU simultaneously transmitted by the plurality of STAs, each of the STAs may include a padding in a UL MU PPDU that it transmits. That is, the STA may determine the transmission time of the UL MU PPDU (or the length of the UL MU PPDU) based on the information about a transmission time included in the poll frame eliciting transmission of the UL MU PPDU, determine whether to include a padding in the UL MU PPDU based on the determined UL MU PPDU transmission time (or UL MU PPDU length), and determine the length of the padding when the padding is to be included.

Specifically, since the plurality of STAs, which simultaneously transmit the UL MU PPDU, may differ in data length, the STAs may include paddings in the UL MU PPDU in order to prevent the increase of processing complexity of a UL MU PPDU receiver in case the UL transmissions end at different time points in different resources (e.g., subchannels or streams) allocated to the plurality of STAs, or to protect the UL MU PPDU from a third-party STA.

The padding may include a MAC padding or a PHY padding. The MAC padding includes adding as many padding bits as a required size after an MPDU including actual payload at the MAC layer. For example, an MPDU (i.e., an A-MPDU subframe) of a predetermined size may be added after an MPDU including actual payload. The MPDU (i.e., the A-MPDU subframe) of the predetermined size added for the MAC padding may correspond to one or more 4-octet MPDUs (or A-MPDU subframes) having null data (e.g., a zero-octet MSDU). The PHY padding is a padding used to match the number of coded bits of the last OFDM symbol to a specific criterion (e.g., a parameter value for coded bits per OFDM symbol (i.e., $N_{CBPS}$)), when an A-MPDU is configured into one PSDU at the PHY layer. The number of bits added as the padding may be 8 (i.e., 1 octet) or smaller.

In the example of FIG. 14, STA1 has data to be transmitted during a transmission time indicated by a poll frame triggering UL MU transmission. Then, STA1 may transmit a UL MU PPDU with only a PHY padding, without a MAC padding. In contrast, STA2, STA3, and STA4 do not have data to be transmitted during the transmission time indicated by the UL MU Poll frame. Then, each of STA2, STA3, and STA4 may determine the length of a MAC padding based on the amount of data to be transmitted, apply the MAC padding, and then apply a PHY padding, thus performing the UL MU PPDU transmission. Therefore, the transmission times of the UL MU PPDU transmitted by STA1, STA2, STA3, and STA4 may be aligned with one another. That is, transmissions of all of the STAs may end at a time point indicated by the UL MU Poll frame (or UL MU trigger frame) in the UL MU PPDU.

Further, in a UL MU PPDU in which transmissions of a plurality of STAs have the same transmission time (or end at the same time point), a transmission scheme of an ACK for the UL MU PPDU may be indicated by an ACK Policy field included in the MAC header of data transmitted by the plurality of STAs. For example, if the ACK Policy is set to Immediate Block ACK, a data receiving STA may transmit a block ACK frame immediately, for example, an SIFS after the UL MU PPDU transmission ends. Or in the case where the ACK Policy is set to Delayed Block ACK, if a data transmitting STA transmits a block ACK request frame to a data receiving STA after data transmission ends, the data receiving STA may transmit a frame including a block ACK in response to the block ACK request frame.

According to the present disclosure, one or more of STAs that simultaneously transmit data units may set the ACK Policies to Immediate Block ACK. If a plurality of STAs that simultaneously transmit data units set the ACK Policies commonly to Immediate Block ACK, the AP may simultaneously transmit ACKs (e.g., a block ACK) in response to the data units simultaneously transmitted by the plurality of STAs. If the ACK Policies of a first group including a part of the plurality of STAs that simultaneously transmit data units (e.g., an STA group including one or more STAs) are set to Immediate Block ACK and the ACK Policies of a second group (e.g., including the other STA(s) except for the STA(s) of the first group) are set to Delayed Block ACK, the AP may sequentially transmit an ACK(s) for the data unit(s) transmitted by the STA(s) of the second group after transmitting ACKs for a data unit(s) transmitted by the STA(s) of the first group.

Upon receipt of UL MU transmission from the plurality of STAs, the AP may transmit ACK information for the received UL MU PPDU to the plurality of STAs. Information triggering UL MU transmission of the plurality of STAs may be transmitted along with the ACK information for the plurality of STAs. For example, a block ACK frame may further include information triggering additional UL MU transmission or a poll frame triggering additional UL MU transmission may further include the ACK information. That is, the AP may transmit the poll frame triggering UL MU transmission and the block ACK frame in one PPDU.

Figure 15:
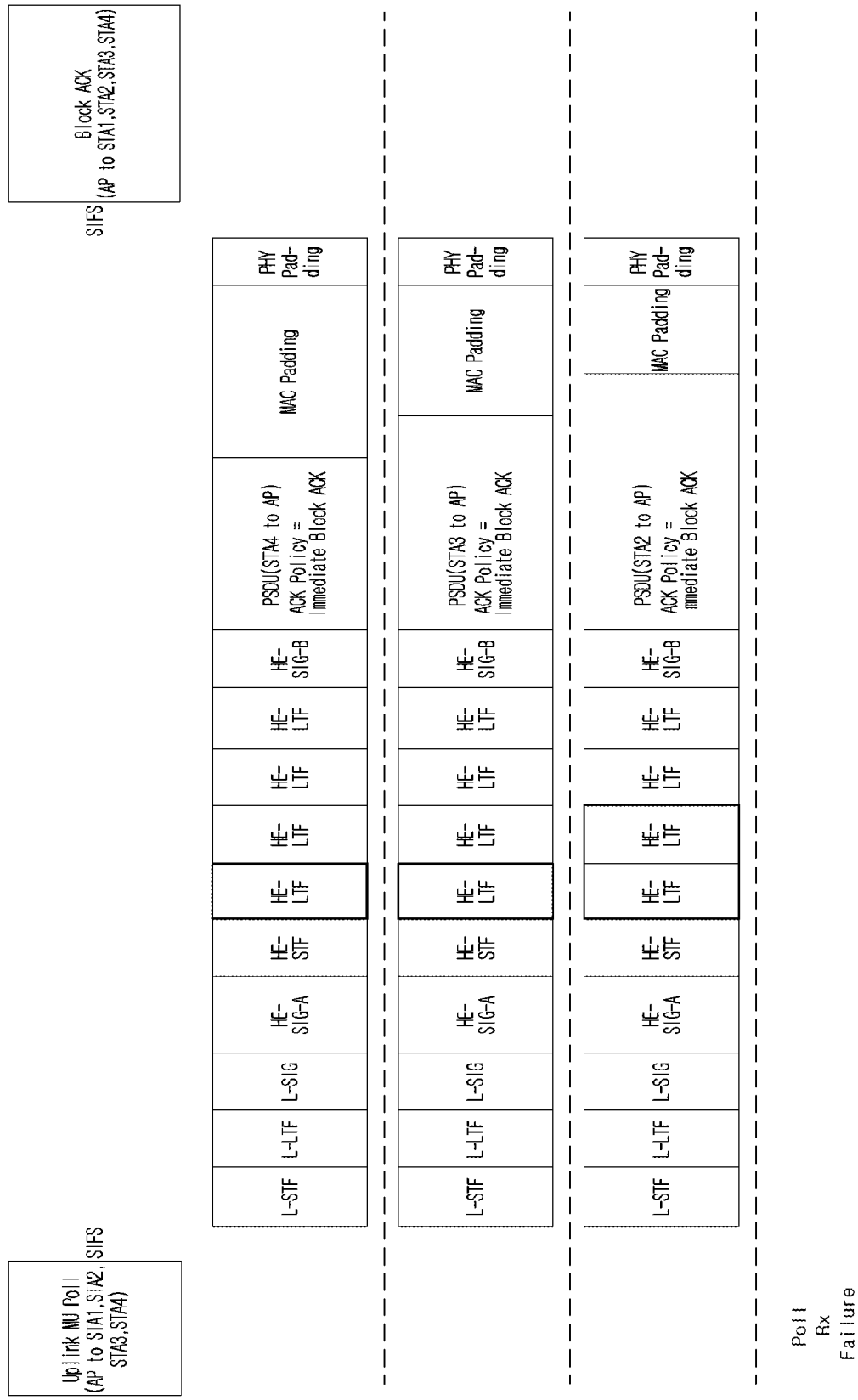

FIG. 15 depicts another exemplary frame exchange sequence including UL MU transmission according to the present disclosure.

In the example of FIG. 15, it is assumed that STA1 fails to receive a poll frame triggering UL MU transmission from STA1, STA2, STA3, and STA4. STA1 that has failed to receive the UL MU Poll frame may not participate in the UL MU transmission, whereas only STA2, STA3, and STA4 may simultaneously transmit a UL MU PPDU.

In the UL MU transmission, STA2, STA3, and STA4 may apply MAC paddings based on a transmission time indicated by the UL MU Poll frame. Because a MAC padding applied by each of STA2, STA3, and STA4 is based on the transmission time of UL MU transmission including transmission of STA1, the MAC padding transmission periods of STA2, STA3, and STA4 do not include meaningful data transmission, unnecessarily occupying a wireless medium in UL MU transmission except for transmission of STA1. That is, if the other STAs apply MAC paddings to a UL MU PPDU in a situation in which a part (e.g., STA1) of a plurality of STAs has enough data to be transmitted during a transmission period given to the STAs by a UL MU Poll frame does not participate in UL MU transmission, system performance may be degraded.

Figure 16:
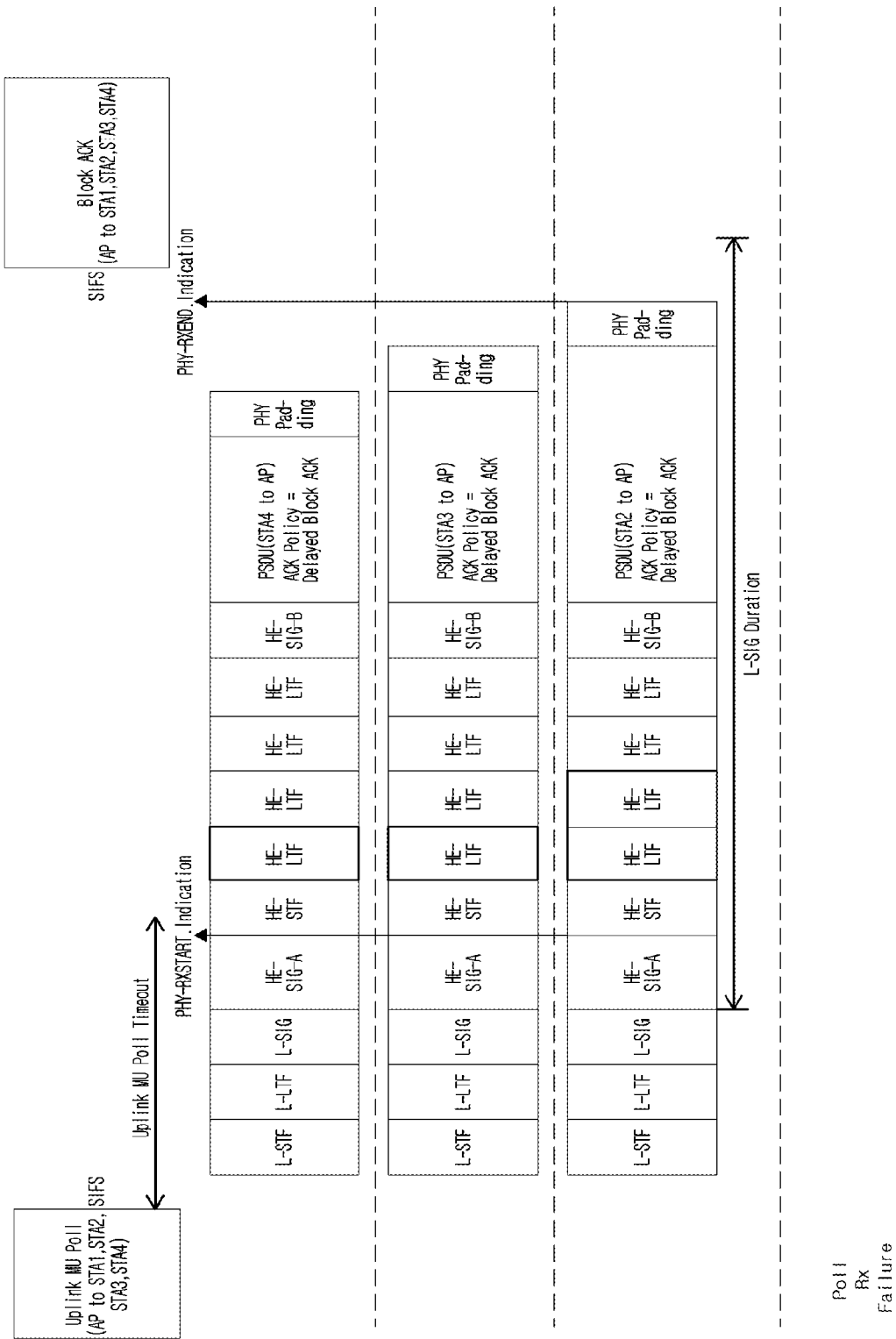

FIG. 16 depicts another exemplary frame exchange sequence including UL MU transmission according to the present disclosure.

In the example of FIG. 16, it is assumed that STA1 fails to receive a poll frame triggering UL MU transmission of STA1, STA2, STA3, and STA4. STA1 that has failed to receive the UL MU Poll frame may not participate in the UL MU transmission, whereas only STA2, STA3, and STA4 may simultaneously transmit a UL MU PPDU.

FIG. 16 illustrates an exemplary case in which a plurality of STAs are allowed to have different UL MU PPDU transmission times (or different UL MU PPDU lengths) in UL MU transmission of the STAs triggered by a UL MU Poll frame. That is, different transmission times of a UL MU PPDU for a plurality of STAs may mean that transmission times of legacy preambles (e.g., L-STFs, L-LTFs, and L-SIGs) and transmission times of HE preambles (e.g., HE-SIG-As, HE-SIG-Bs, HE-STFs, HE-LTFs, etc.) are aligned among the plurality of STAs and data (e.g., PSDUs) starts at the same time point but ends at different points for the plurality of STAs in the UL MU PPDU. Also, different transmission times of a UL MU PPDU for a plurality of STAs may mean that the plurality of STAs do not apply MAC paddings. However, the plurality of STAs may apply PHY paddings for transmission of the UL MU PPDU.

Further, if different UL MU PPDU transmission times are allowed for a plurality of STAs, even though a poll frame triggering UL MU transmission includes information about a UL MU PPDU transmission time (or a UL MU PPDU length), the plurality of STAs may not apply MAC paddings based on the information about the UL MU PPDU transmission time. However, an STA(s) performing the UL MU transmission may perform the UL MU PPDU transmission within the UL MU PPDU transmission time indicated by the UL MU Poll frame.

As described above, even though a part of a plurality of STAs whose UL MU transmission is triggered by a UL MU Poll frame do not perform the UL transmission, if the other STA(s) does not apply a MAC padding to transmission of a UL MU PPDU, degradation of system performance caused by an unnecessary MAC padding may not occur.

In addition, in the case where a part of a plurality of STAs whose UL MU transmission is triggered by a UL MU Poll frame do not perform the UL transmission and the UL MU PPDU transmission time of the other STA(s) is changed, if the ACK Policy of the other STA(s) is set to Immediate Block ACK, it may be ambiguous for the AP to determine an STA whose ending time of a UL MU PPDU is a time when ACK information is to be transmitted in response to the UL MU PPDU. Moreover, since each of the plurality of STAs participating in the UL MU transmission does not have knowledge of the ending times of UL MU transmission of the other STAs except for the STA, the STA does not determine when it will receive a frame including ACK information in response to the UL MU transmission. That is, if a plurality of different UL MU PPDU transmission times are allowed, each of the plurality of STAs whose UL MU transmission is triggered may not expect an immediate control response after transmitting the UL MU PPDU and may not define a timer and a timeout procedure for the control response frame. Accordingly, if a plurality of different UL MU PPDU transmission times are allowed, the ACK Policy of each of the plurality of STAs may be set to Delayed Block ACK instead of Immediate Block ACK.

Now, a detailed description will be given of an operation for transmitting a block ACK frame by an AP receiving a UL MU PPDU.

The AP may determine a transmission time of a block ACK frame to be after an SIFS from, for example, the ending time of reception of the last data unit of a UL MU PPDU (e.g., a time when the PHY layer invokes a PHY-RXEND.Indication primitive to the MAC layer), commonly in both the cases where the ACK Policies of data units from one or more of a plurality of STAs transmitting a UL MU PPDU are set to Immediate Block ACK as illustrated in FIGS. 14 and 15 and to Delayed Block ACK as illustrated in FIG. 16. However, the ending times of data units received from a plurality of STAs coincide with a time indicated by a UL MU Poll frame (or a UL MU trigger frame) in the case of FIGS. 14 and 15, whereas the ending times of data units received from a plurality of STAs may be different in the case of FIG. 16. In consideration of this aspect, the AP may determine the reception completion time of a UL MU PPDU.

In regard to this, an error recovery procedure for the UL MU transmission triggering procedure will be described. When transmitting a poll frame triggering UL MU transmission, the AP may activate a UL MU poll timer until the AP starts to receive a UL MU PPDU. The UL MU poll timer expires at a time point when a time period corresponding to a UL MU Poll timeout elapses. If the AP receives a valid start (e.g. a valid PHY header) of a UL MU PPDU within a UL MU Poll timeout, the PHY of the AP may invoke the PHY-RXSTART.Indication primitive to the MAC.

If the PHY-RXSTART.Indication primitive is invoked within the UL MU Poll timeout, the AP may consider that at least one of STAs requested for the UL MU transmission has started to transmit a UL MU PPDU. That is, if the AP receives a data unit (e.g., an MPDU) from at least one STA indicated by polling for UL MU transmission (or UL MU triggering), the AP may determine that it has started to receive the UL MU transmission successfully. That is, if the AP receives a data unit (e.g., an MPDU) from at least one STA indicated by polling for UL MU transmission (or UL MU triggering), the AP may determine that frame exchange initiated by the UL MU polling (or UL MU triggering) is successful.

On the other hand, if the PHY-RXSTART.Indication primitive has not been invoked within the UL MU Poll timeout, the AP may perform the error recovery procedure, determining that an error has occurred to the polling procedure for triggering UL MU transmission, which will be described with reference to FIG. 17.

Meanwhile, when determining whether transmission of a UL MU PPDU has been completed, the AP may invoke the PHY-RXEND.Indication primitive. The PHY-RXEND.Indication primitive corresponds to indication information indicating to a local MAC entity that a current PSDU has been completely received by the PHY. This primitive provides parameters as listed in [Table 4] below.

TABLE 4

PHY-RXEND.indication(
  RXERROR,
  RXVECTOR
)

In [Table 4], an RXERROR parameter may deliver at least one of values indicating NoError, FormatVioloation, CarrierLost, and UnsupportedRate. After a receive state machine of the PHY detects what looks like a valid preamble and Start Frame Delimiter (SFD), a plurality of error conditions may occur. The following parameters are returned for the respective error conditions.

NoError. This value is used to indicate that no error has occurred during a reception process at the PHY.

FormatViolation. This value is used to indicate that there is an error in the format of a received PPDU.

CarrierLost. This value is used to indicate that a carrier cannot be found during reception of an incoming PSDU and thus PSDU processing cannot be performed any longer.

UnsupportedRate. This value is used to indicate that an unsupported data rate has been detected during reception of an incoming PPDU.

Filtered. This value is used to indicate that an incoming PPDU has been filtered out due to a condition set by PHYCONFIG_VECTOR during reception of the incoming PPDU.

In [Table 4], RXVECTOR represents a list of parameters provided to the local MAC entity by the PHY, when the PHY receives a valid PHY header or the last PSDU data bit of a received frame. Only if a dot11RadioMeasurementActivated parameter is set to True, RXVECTOR is included. RXVECTOR may include all of MAC parameters and MAC management parameters.

A PHY-RXEND.Indication primitive may be generated to indicate to the local MAC entity that the receive state machine of the PHY has completed reception with or without an error. In the presence of Signal Extension, the PHY-RXEND.Indication primitive may be generated at the ending point of the Signal Extension.

If the value of RXERROR is NoERROR, the MAC may use the PHY-RXEND.Indication primitive as a reference for a channel access timing.

Upon receipt of a UL MU PPDU from a plurality of STAs, the AP may determine one reception starting time based on reception starting times of the PPDU from the STAs and one reception ending time based on reception ending times of data units (e.g., PSDUs) from the STAs. For this purpose, the PHY of the AP may determine one reception starting time or one reception ending time, or the MAC of the AP may determine one reception starting time or one reception ending time.

Specifically, upon receipt of a UL MU PPDU from a plurality of STAs, the AP may invoke one PHY-RX-START.Indication primitive and one PHY-RXEND.Indication primitive from the PHY to the MAC. For example, the PHY may invoke the PHY-RXSTART.Indication primitive at one reception starting time (e.g., at one common reception starting time if the UL MU PPDU is received at the same starting time from the plurality of STAs as illustrated in the example of FIGS. 14 and 15, or at one (e.g., the last) of different reception starting times of the UL MU PPDU from the plurality of STAs as illustrated in the example of FIG. 16) based on time points at which data units start to be received from the plurality of STAs. Also, the PHY may invoke the PHY-RXEND.Indication primitive at one reception ending time (e.g., at one common reception ending time if the UL MU PPDU reception is completed at the same time point from the plurality of STAs as illustrated in the example of FIGS. 14 and 15, or at one (e.g., the last) of different reception ending times of the UL MU PPDU from the plurality of STAs as illustrated in the example of FIG. 16) based on time points at which the data units are completely received from the plurality of STAs.

Or the PHY of the AP may invoke individual PHY-RXSTART.Indication primitives and individual PHY-RX-END.Indication primitives to the MAC, for the UL MU PPDU received from the plurality of STAs. That is, the PHY may invoke a plurality of PHY-RXSTART.Indication primitives corresponding to the respective starting times of PPDU reception from the plurality of STAs to the MAC, and the MAC may determine one of them (e.g., one common reception starting time or the last reception starting time) to be a PPDU reception starting time. Also, the PHY may invoke a plurality of PHY-RXEND.Indication primitives corresponding to the respective ending times of PPDU reception from the plurality of STAs to the MAC, and the MAC may determine one of them (e.g., one common reception ending time or the last reception ending time) to be a PPDU reception ending time.

If the AP has completely received PSDUS from all STAs transmitting the UL MU PPDU in this manner, the AP may determine a time point at which the PHY-RXEND.Indication is invoked to be an ending time of the UL MU PPDU reception. Accordingly, the AP may transmit a block ACK frame an SIFS after the ending time of the UL MU PPDU reception. For example, a PHY-RXEND.Indication primitive corresponding to one common ending time of PSDU reception from a plurality of STAs may be invoked and a block ACK frame may be transmitted an SIFS after the invocation time of the PHY-RXEND.Indication primitive in the case of FIGS. 14 and 15. In the case of FIG. 16, although PSDU reception from a plurality of STAs ends at different time points, a PHY-RXEND.Indication primitive corresponding to the last of the ending times may be invoked and a block ACK frame may be transmitted an SIFS after the invocation time.

If the RXERROR parameter of a data unit received from at least one of all STAs transmitting the UL MU PPDU is set to NoERROR, the AP may transmit a block ACK frame to the STAs.

For example, upon receipt of a UL MU PPDU including data units simultaneously transmitted from STA1, STA2, STA3, and STA4, the AP may confirm that the ACK Policies of STA1, STA2, STA3, and STA4 are Immediate Block ACK and the PHY of the AP may transmit a block ACK frame an SIFS after the ending time of the UL MU PPDU (e.g., a common time point at which the data units of STA1, STA2, STA3, and STA4 end) in the example of FIG. 14. Herein, if the RXERROR parameter of at least one of the data units received from STA1, STA2, STA3, and STA4 is set to NoERROR, the AP may transmit a block ACK frame. For example, the block ACK frame may include ACK information for the data units received from STA1, STA2, STA3, and STA4.

In the example of FIG. 15, upon receipt of a UL MU PPDU including data units simultaneously transmitted from STA2, STA3, and STA4, the AP may confirm that the ACK Policies of STA2, STA3, and STA4 are Immediate Block ACK and transmit a block ACK frame an SIFS after the ending time of reception of the UL MU PPDU at the PHY (e.g., a common ending time of the data units from STA2, STA3, and STA4). If the RXERROR parameter of at least one of the data units transmitted from STA2, STA3, and STA4 is set to NoERROR, the AP may transmit the block ACK frame. For example, the block ACK frame may include ACK information for the data units transmitted from STA2, STA3, ad STA4. Or the block ACK frame may include ACK information for STA1 STA2, STA3, and STA4 requested for the UL MU transmission (in this case, ACK information for STA1 may indicate failure of data reception from STA1).

In the example of FIG. 16, upon receipt of a UL MU PPDU including data units simultaneously transmitted from STA2, STA3, and STA4, the AP may confirm that the ACK Policies of STA2, STA3, and STA4 are Delayed Block ACK and transmit a block ACK frame an SIFS after the ending time of reception of the last UL MU PPDU at the PHY (e.g., a time at which a PHY-RXEND.Indication primitive is generated). If the RXERROR parameter of at least one of the data units transmitted from STA2, STA3, and STA4 is set to NoERROR, the AP may transmit the block ACK frame. For example, the block ACK frame may include ACK information for the data units transmitted from STA2, STA3, ad STA4. Or the block ACK frame may include ACK information for STA1 STA2, STA3, and STA4 requested for the UL MU transmission (in this case, ACK information for STA1 may indicate failure of data reception from STA1).

Meanwhile, to protect a UL MU PPDU transmitted by a plurality of STAs (e.g., STA2, STA3, and STA4) in the example of FIG. 16, duration information included in the legacy preamble (e.g., an L-SIG field) of the UL MU PPDU may be set to a value (e.g., a time corresponding to an L-SIG Duration in FIG. 16) covering at least a remaining transmission time after transmission of the legacy preamble of the UL MU PPDU and a time at which a block ACK frame starts to be transmitted in response to the UL MU PPDU (i.e., a time at which a valid PLCP header of the block ACK frame is transmitted). Thus, a third-party STA may check the legacy preamble of the UL MU PPDU and set a NAV so that a medium may be regarded as busy during a time period indicated by the L-SIG Duration. In the example of FIG. 16, the value of duration information of the L-SIG of STA2 transmitting the longest data unit may be largest and the NAV of the third-party STA may be set according to the value of the duration information of the L-SIG of STA2.

Figure 17:
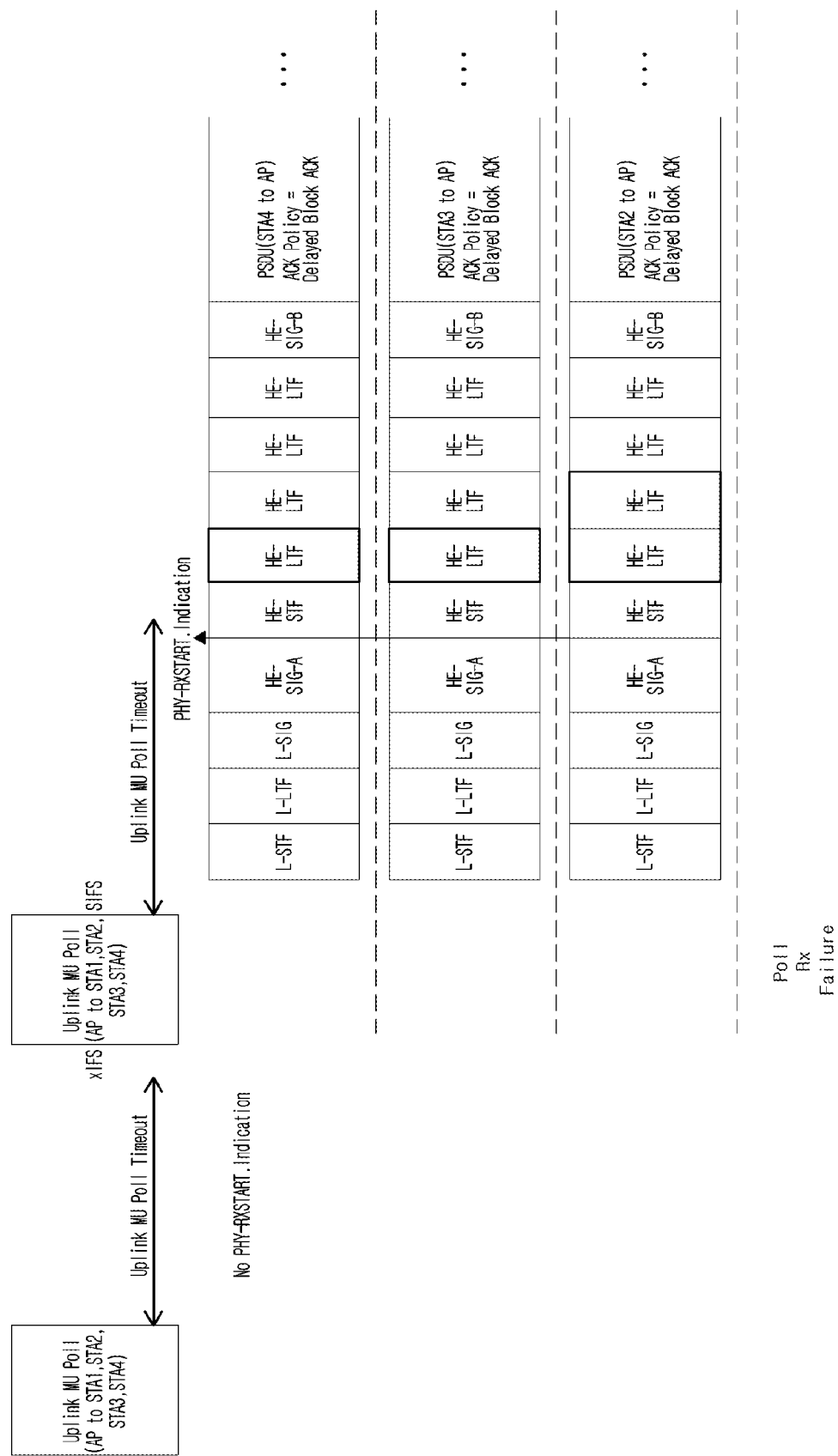

FIG. 17 depicts another exemplary frame exchange sequence including UL MU transmission according to the present disclosure.

FIG. 17 illustrates a procedure for recovering UL MU polling (or UL MU triggering), when an AP transmits a UL MU Poll frame and a PHY-RXSTART.Indication primitive is not invoked during a UL MU Poll timeout. If the PHY-RXSTART.Indication primitive is not invoked during the UL MU Poll timeout period, the AP may determine whether a channel is idle during a specific IFS (referred to as an xIFS which may correspond to, for example, a PIFS or AIFS[i]) by CCA. If the channel is idle, the AP may transmit an additional UL MU Poll frame to STAs.

Hereinbelow, examples of UL MU triggering supporting random access for UL MU transmission according to the present disclosure will be described.

Basically, UL MU transmission may be performed by UL MU polling (or UL MU triggering) of the AP. That is, STAs that will perform UL MU transmission may be selected by a poll frame triggering the UL MU transmission (or a UL MU trigger frame) provided by the AP, resources for the UL MU transmission (e.g., a UL MU transmission time and subchannels or streams used for the UL MU transmission) may be allocated, and the plurality of STAs may perform the UL MU transmission based on the allocated resources.

Meanwhile, random access for UL MU transmission means that STAs unspecified by an AP perform UL MU transmission or a plurality of STAs perform UL MU transmission using resources unspecified by the AP. An STA performing the UL MU random access may be any of predetermined STA candidates and the resources used for the UL MU random access may be any of predetermined resource candidates. That is, the candidate STAs or candidate resources for the UL MU random access may be predetermined and the UL MU random access may be performed by any of the candidates STAs or using any of the candidate resources.

In an example of UL MU random access according to the present disclosure, a UL MU Poll Request frame and a UL MU Poll Response frame may be defined and used. The UL MU Poll Request frame may correspond to a frame triggering (or eliciting) UL MU random access of a plurality of STAs, and the UL MU Poll Response frame may correspond to a frame transmitted by each of the plurality of STAs by UL MU random access. Also, STAs that will participate in UL MU PPDU transmission (e.g., STAs having data to be transmitted to an AP) may be predetermined through exchange between a UL MU Poll Request frame and UL MU Poll Response frames.

The examples of the present disclosure regarding a UL MU PPDU transmission time provided by UL MU transmission triggering information, an ACK for UL MU transmission, and error recovery for UL MU transmission as described before are applicable to a plurality of frames transmitted by UL MU random access. The description of a poll frame triggering UL MU transmission in the foregoing examples is applicable to a frame triggering UL MU random access (e.g., a UL MU Poll Request frame), and the description of UL MU transmission elicited by a poll frame triggering the UL MU transmission and an ACK transmitted in response to the poll frame is applicable to a frame transmitted by UL MU random access (e.g., a UL MU Poll Response frame) and an ACK (e.g., a UL MU Poll Confirm frame or a block ACK frame) transmitted in response to the frame.

To trigger UL MU random access, the AP may broadcast a UL MU Poll Request frame. That is, destination STAs are not specified for the UL MU Poll Request frame. Rather, any STA may receive the UL MU Poll Request frame. Among STAs receiving the UL MU Poll Request frame, an STA having a data frame to be transmitted to the AP (i.e., an STA to participate in transmission of a UL MU PPDU) may transmit a UL MU Poll Response frame to the AP. The UL MU Poll Response frame may be transmitted in immediate response to the UL MU Poll Request frame (i.e., the STA may transmit the UL MU Poll Response frame an SIFS after receiving the UL MU Poll Request frame).

If a plurality of STAs transmit such UL MU Poll Response frames, the UL MU Poll Response frames may be configured in a UL MU PPDU format. For example, a UL MU Poll Response frame may have a fixed frame size and to minimize protocol overhead caused by collision, the UL MU Poll Response frame may have a small frame size. For example, the UL MU Poll Response frame may have a control frame format. Also, the UL MU Poll Response frame may include identification information (e.g., a MAC address or an AID) of the transmitting STA (i.e., an STA to participate in the UL MU PPDU transmission), information about a buffer status, and information about resources to be used for the UL MU PPDU transmission (e.g. a resource unit, a subchannel, or the number of space-time streams).

Figure 18:
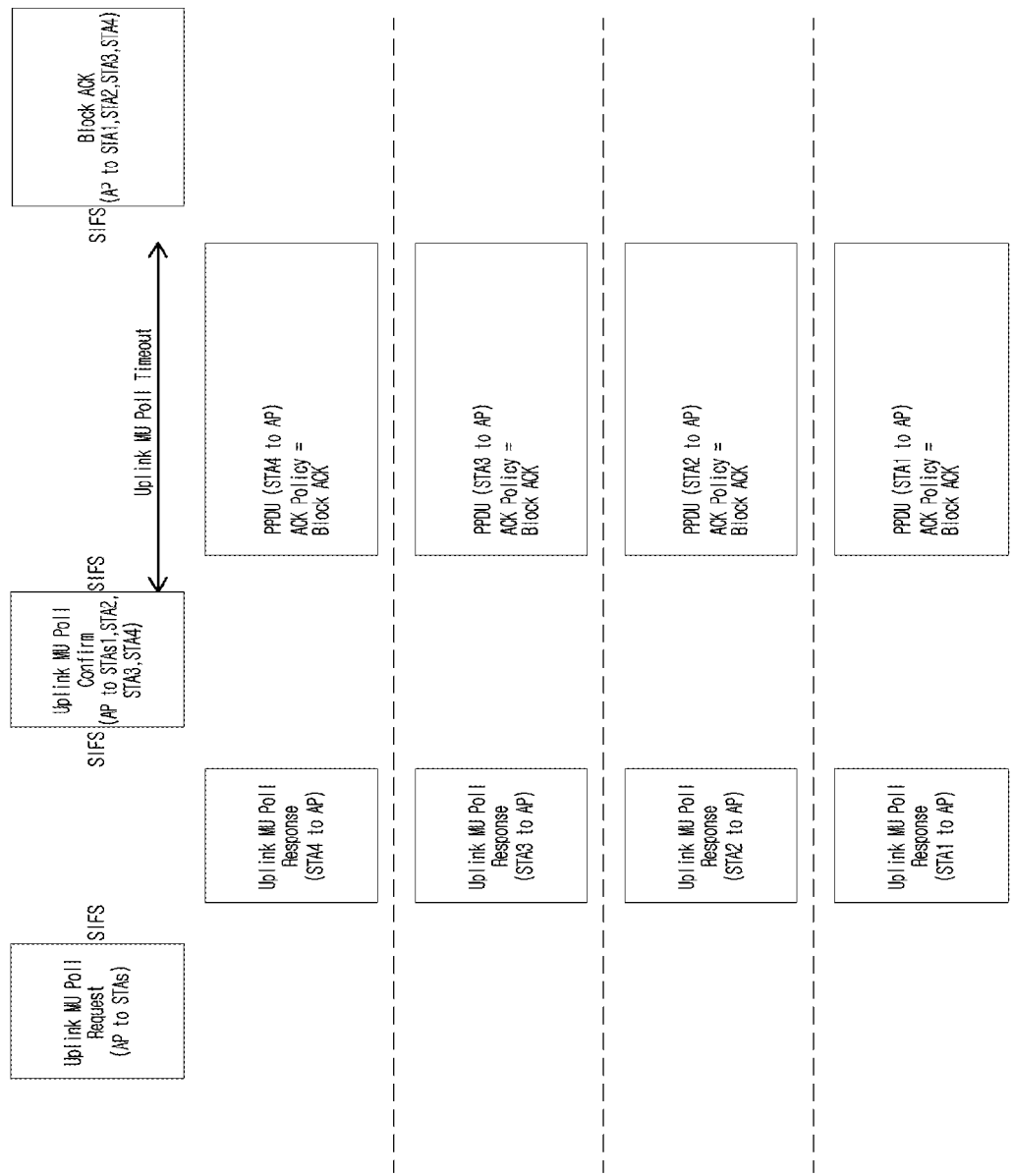
FIGS. 18 and 19 depict exemplary exchanges of a UL MU Poll Request frame, a UL MU Poll Response frame, and a UL MU Poll Confirm frame according to the present disclosure.
Figure 19:
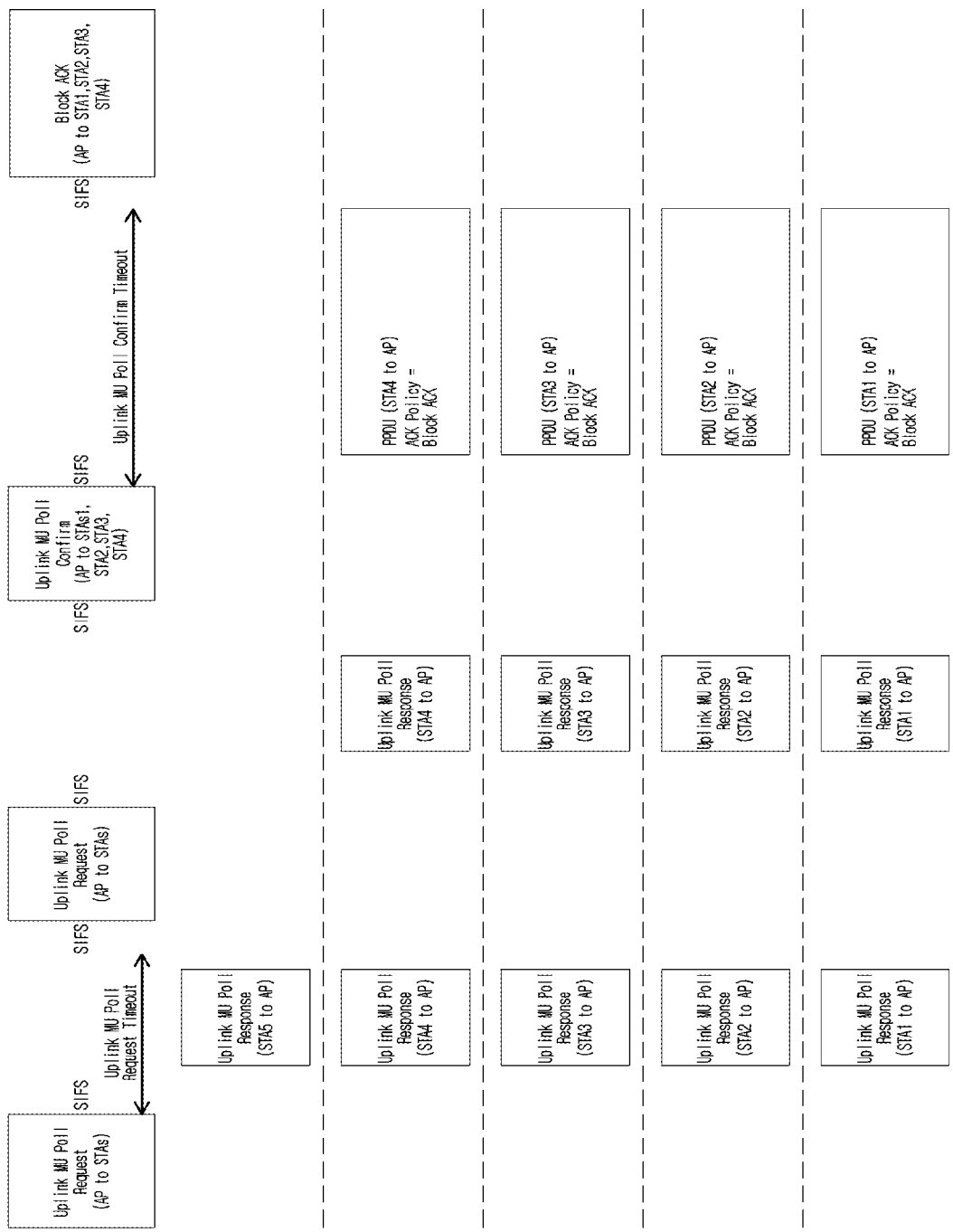

FIGS. 18 and 19 depict exemplary exchanges of a UL MU Poll Request frame, a UL MU Poll Response frame, and a UL MU Poll Confirm frame according to the present disclosure.

If the AP broadcasts a UL MU Poll Request frame, STAs that will participate in UL MU PPDU transmission may receive the UL MU Poll Request frame and transmit UL MU Poll Response frames to the AP an SIFS later. In the examples of FIGS. 18 and 19, it is assumed that an AP is capable of receiving a UL MU PPDU simultaneously from a plurality of STAs in four distinguished resources (e.g., four subchannels or four space-time streams). If one STA uses one resource, up to four STAs may participate in the UL MU PPDU transmission.

As illustrated in the example of FIG. 18, if four STAs simultaneously transmit UL MU Poll Response frames, each STA using one resource (e.g., one resource unit or one space-time stream), the AP may identify the STAs that want to participate in UL MU PPDU transmission by receiving the UL MU Poll Response frames from the four STAs. Thus, the AP may transmit a UL MU Poll Confirm frame to STA1, STA2, STA3, and STA4 an SIFS after receiving the UL MU Poll Response frames. The UL MU Poll Confirm frame may correspond to a poll frame triggering UL MU transmission in the foregoing examples. Upon receipt of the UL MU Poll Confirm frame, STA1, STA2, STA3, and STA4 may perform the UL MU PPDU transmission based on trigger information provided by the AP. The ACK Policy of a data unit from each of the plurality of STAs, included in the UL MU PPDU may be set to Block ACK. Accordingly, the plurality of STAs may attempt to receive a block ACK frame from the AP an SIFS after transmitting the UL MU PPDU.

The example of FIG. 19 illustrates a case where more STAs than the AP may support for UL MU transmission respond to a UL MU Poll Request frame. For example, if each STA uses one resource (e.g., one subchannel or one space-time stream), the AP may receive UL MU transmission from four STAs simultaneously in four distinguished resources. If five STAs (e.g., STA1, STA2, STA3, STA4, and STA5) out of the STAs receiving the broadcast UL MU Poll Request frame transmit UL MU Poll Response frames, the AP may not receive the UL MU Poll Response frames successfully. That is, a plurality of STAs may perform UL MU random access according to a UL MU Poll Request frame. Transmissions of some STAs may collide during random access. In this case, the AP may not successfully receive UL MU transmission in the random access scheme. Therefore, the AP may broadcast an additional UL MU Poll Request frame after a UL MU Poll Request timeout. If four STAs (e.g., STA1, STA2, STA3, and STA4) transmit UL MU Poll Response frames, the AP may receive the UL MU Poll Response frames successfully and then transmit a UL MU Poll Confirm frame to the four STAs. Therefore, the four STAs may perform UL MU PPDU transmission and attempt to receive a block ACK frame.

Herein, a frame triggering simultaneous UL transmission (i.e., UL MU random access) of arbitrary STAs (e.g., a UL MU Poll Request frame) may include response condition information. A response condition may include the AC of UL data, a buffer size, etc. If the AP broadcasts a second UL MU Poll Request frame after a timeout occurs for a transmitted first UL MU Poll Request frame, a second response condition included in the second UL MU Poll Request frame may be reinforced or limited compared to a first response condition included in the first UL MU Poll Request frame. For example, the number of STAs satisfying the second response condition may be set to be smaller than the number of STAs satisfying the first response condition. The example of FIG. 19 corresponds to a case in which although STA1, STA2, STA3, STA4, and STA5 satisfy the first response condition included in the first UL MU Poll Request frame, only STA1, STA2, STA3, and STA4 except for STA5 satisfy the second response condition included in the second UL MU Poll Request frame.

Further, a frame triggering UL MU random access may include information about responding STA candidates or resource candidates as a response condition for the frame. STAs satisfying the response condition may transmit response frames (e.g., UL MU Poll Response frames) by UL MU random access. If the AP fails to receive the response frames due to collision between transmissions of the response frames, the AP may transmit a frame triggering additional UL MU random access by reinforcing or limiting the response condition.

Also, a response frame transmitted in the UL MU random access scheme by an STA receiving the frame triggering UL MU random access may include information about the buffer status of the responding STA, a property of UL data (e.g., AC), or UL data.

Figure 20:
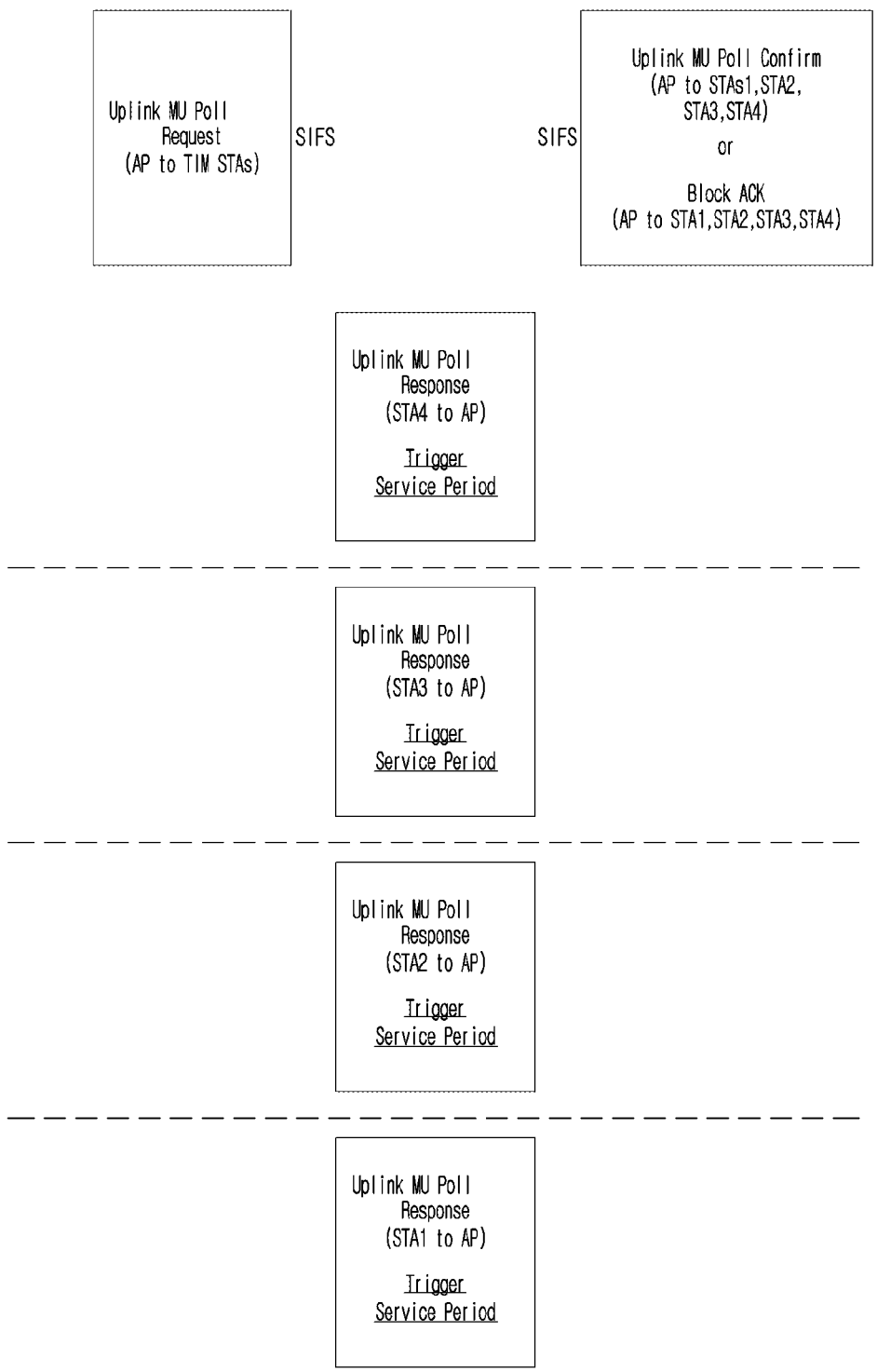
FIG. 20 depicts UL MU random access of Stations (STAs) operating in power save mode according to the present disclosure.

FIG. 20 depicts UL MU random access of STAs operating in power save mode according to the present disclosure.

In the presence of data (i.e., DL data) buffered in the AP for transmission to an STA operating in the power save mode, the STA may transmit signaling information indicating that it has switched from a doze state to an awake state and requesting DL data (the signaling information may be included in a poll frame requesting DL data (e.g., a Power Save (PS)-Poll frame or a trigger frame triggering a service period, and this poll frame is distinguished from a poll frame or trigger frame triggering UL MU transmission) to the AP based on a Traffic Indication Map (TIM) included in a beacon frame or the like. The STA operating in the power save mode may also operate in doze mode or awake mode to save power. Hereinbelow, an STA operating in the power save mode is referred to as a TIM STA.

To support UL MU random access of a TIM STA, the AP may broadcast a frame triggering UL MU random access (e.g., a UL MU Poll Request frame) for TIM STAs. For example, a response condition included in the frame triggering UL MU random access may be set to limit responding STA candidates to TIM STAs. Upon receipt of the frame triggering UL MU random access, an STA may transmit a PS-Poll frame or trigger frame requesting DL data to the AP in UL MU.

For example, the frame triggering UL MU random access of a plurality of TIM STAs by the AP may correspond to a UL MU Poll Request frame, and the PS-Poll frames requesting DL data (or the trigger frame triggering a service period) transmitted simultaneously by the plurality of STAs may correspond to UL MU Poll Response frames. To indicate that a UL MU Poll Response frame corresponds to a PS-Poll frame requesting DL data (or a trigger frame triggering a service period), an End of Service Period (EOSP) field of the UL MU Poll Response frame (e.g., the EOSP field may be included in the QoS Control field of a MAC header) may be set to 0. That is, a UL MU Poll Response frame with an EOSP field set to 0 may execute the same function or play the same role as a PS-Poll frame requesting DL data by a TIM STA (or a trigger frame triggering a service period). Upon receipt of the UL MU Poll Response frame with the EOSP field set to 0, the AP may transmit information indicating successful reception of the UL MU Poll Response frames (i.e., PS-Poll frames requesting DL data (or trigger frames triggering a service period) from a plurality of STAs to the STAs by transmitting a UL MU Poll Confirm frame or a block ACK frame to the plurality of TIM STAs.

In the example of FIG. 20, the AP may elicit transmissions of UL MU Poll Response frames (i.e., PS-Poll frames requesting DL data or trigger frames triggering a service period) from TIM STAs by random access by broadcasting a UL MU Poll Request frame. For this purpose, signaling information indicating that a destination STA of the UL MU Poll Request frame (or an STA allowed to respond to the UL MU Poll Request frame) is a TIM STA operating in the power save mode may be included in the UL MU Poll Request frame.

Among TIM STAs receiving the UL MU Poll Request frame, TIM STAs determining to request DL data (or to trigger a service period) may transmit UL MU Poll Response frames each with an EOSP field set to 0 to the AP an SIFS after receiving the UL MU Poll Request frame. In the example of FIG. 20, STA1, STA2, STA3, and STA4 among a plurality of TIM STAs determine to request DL data (or trigger a service period) and simultaneously transmit UL MU Poll Response frames to the AP.

Upon receipt of the UL MU Poll Response frames each having an EOSP field set to 0 from STA1, STA2, STA3, and STA4, the AP may consider the received UL MU Poll Response frames to be PS-Poll frames requesting DL data (or trigger frames triggering a service period) and transmit a UL MU Poll Confirm frame or a block ACK frame to STA1, STA2, STA3, and STA4 in order to acknowledge reception of the UL MU Poll Response frames.

Upon confirmation of successful reception of the UL MU Poll Response frames (i.e., the PS-Poll frames requesting DL data or the trigger frames triggering a service period) at the AP, the TIM STAs may be kept in the awake state to receive DL frames buffered in the AP. While the TIM STAs are in the awake state, the AP may simultaneously transmit a DL MU PPDU (i.e., a DL MU-MIMO PPDU or a DL OFDMA PPDU) including the DL data buffered for the plurality of TIM STAs in the AP to the plurality of TIM STAs.

Meanwhile, upon receipt of a frame with an EOSP field set to 1 from the AP, a TIM STA may switch from the awake state to the doze state.

In this manner, the TIM STAs' request of UL data or triggering of a service period by UL MU random access may be supported by exchanging a frame triggering UL MU random access of the TIM STAs (e.g., a UL MU Poll Request frame), UL MU random access-based response frames (e.g., UL MU Poll Response frames) of the TIM STAs, and an ACK for the UL MU random access of the TIM STAs (e.g., a UL MU Poll Confirm frame or a block ACK frame). Herein, because the UL MU Poll Confirm frame or the block ACK frame does not include information triggering UL MU PPDU transmission of the plurality of TIM STAs, the TIM STAs may not perform the UL MU PPDU transmission in response to the UL MU Poll Confirm frame or the block ACK frame.

Figure 21:
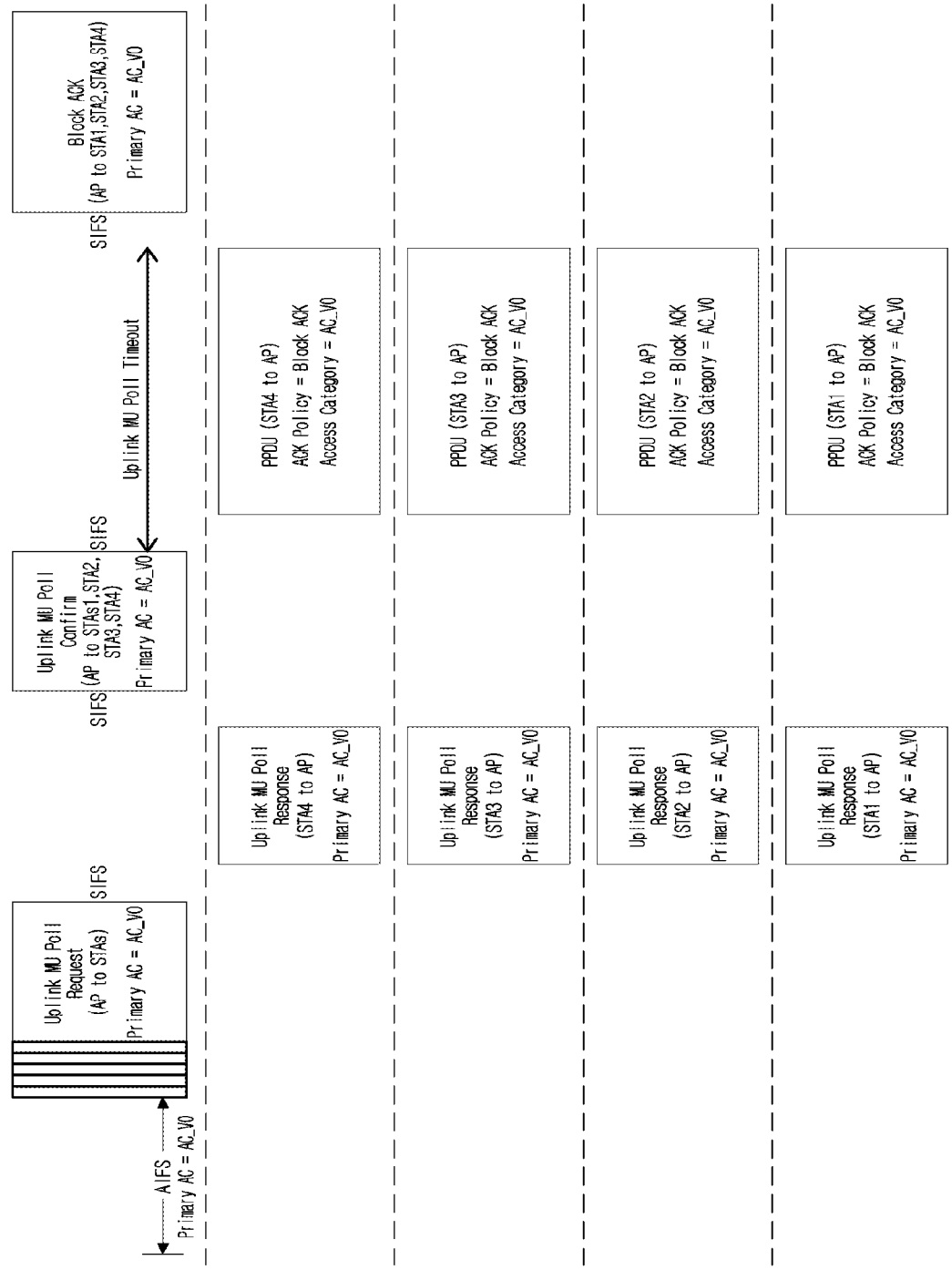
FIG. 21 depicts Access Category (AC)-based UL MU random access according to the present disclosure.

FIG. 21 depicts AC-based UL MU random access according to the present disclosure.

To acquire a TXOP for starting a UL MU transmission procedure, the AP may perform a backoff procedure. For example, after determining that a channel is idle by sensing the channel during a PIFS, DISF, or AIFS[i], the AP may select a random backoff count, wait during a slot time corresponding to the random backoff count, and attempt to transmit a frame. The random backoff count may be selected from a range of 0 to CW where CW is a contention window parameter value. Once the random backoff procedure starts, the AP activates a backoff timer according to the determined backoff count. If the channel is idle during a slot time (e.g., aSlotTime), the AP may decrement the backoff count by 1 each time. If the channel is monitored as busy, the AP discontinues the count-down and waits. If the medium is idle, the AP resumes the remaining count-down. If the backoff timer reaches 0, the AP may transmit a frame (e.g., a poll frame triggering UL MU transmission or a UL MU Poll Request frame).

An AIFS may be determined according to the AC of the backoff procedure. The AC may be determined to be one of AC_VO (Access Category Voice), AC_VI (Access Category Video), AC_BE (Access Category Best Effort), and AC_BK (Access Category Back Ground).

In the present disclosure, the AC of a backoff procedure for transmission of a UL MU Poll Request frame is a primary AC. A frame triggering UL MU random access (e.g., a UL MU Poll Request frame) may include primary AC information (or a primary AC field) as response condition information. Accordingly, STAs having traffic corresponding to an AC indicated by the primary AC information included in the frame triggering UL MU random access (e.g., the UL MU Poll Request frame) among a plurality of STAs may transmit UL MU random access-based response frames (e.g., UL MU Poll Response frames). That is, it may be said that UL MU random access is triggered by the frame triggering UL random access for the STAs having traffic corresponding to the AC indicated by the primary AC information among any STAs. Further, the UL MU random access-based response frames (e.g., the UL MU Poll Response frames) may include information indicating the AC of the STAs participating in the UL MU random access (i.e., primary AC information). Therefore, the AP may determine whether the STAs having traffic corresponding to the primary AC set when the UL MU random access was triggered has performed UL MU random access and may determine STAs whose UL MU transmission is to be triggered.

A frame triggering UL MU transmission (e.g., a UL MU Poll Confirm frame) may include primary AC information. Accordingly, STAs having traffic corresponding to an AC indicated by the primary AC information included in the frame triggering UL MU transmission (e.g., the UL MU Poll Confirm frame) may perform the UL MU transmission. That is, it may be said that UL MU transmission is indicated to STAs having traffic corresponding to the AC indicated by the primary AC information by the frame triggering UL MU transmission. Further, the UL MU transmission (e.g., UL MU PPDU transmission) may include information indicating the AC of traffic transmitted in UL MU.

In the example of FIG. 21, it is assumed that an AC (i.e., a primary AC) used for the AP to transmit a UL MU Poll Request frame is AC_VO. In other words, the primacy AC information of the UL MU Poll Request frame may be set to a value corresponding to AC_VO. Among STAs receiving the UL MU Poll Request frame, only STAs having traffic corresponding to AC_VO indicated by the primary AC information (e.g., STA1, STA2, STA3, and STA4) may transmit UL MU Poll Response frames to the AP by UL MU random access. Primary AC information included in the UL MU Poll Response frames may also be set to a value indicating AC_VO. Therefore, the AP may request or indicate STA1, STA2, STA3, and STA4 to transmit traffic corresponding to AC_VO by transmitting a UL MU Poll Confirm frame triggering UL MU transmission of STA1, STA2, STA3, and STA4. Primary AC information included in the UL MU Poll Confirm frame may also be set to a value indicating AC_VO. Therefore, traffic transmitted in a UL MU PPDU elicited by the UL MU Poll Confirm frame by each STA may be confined to traffic corresponding to AC_VO.

Additionally, UL MU transmission efficiency may be increased by not limiting UL MU random access or UL MU transmission to a specific AC. For example, if primary AC information included in a UL MU Poll Request frame, a UL MU Poll Response frame, and a UL MU Poll Confirm frame is set to a specific value other than the values indicating AC_VO, AC_VI, AC_BE, and AC_BK, it may be considered that there is no constraint on an AC for UL MU random access or UL MU transmission (i.e., UL MU random access or UL MU transmission is allowed for traffic corresponding to any AC).

If the primary AC information of a UL MU Poll Request frame is set to a specific value other than the values indicating AC_VO, AC_VI, AC_BE, and AC_BK, STAs having traffic to be transmitted to the AP may transmit UL MU Poll Response frames irrespective of the ACs of the traffic. In addition, if the primary AC information of a UL MU Poll Confirm frame is set to a specific value other than the values indicating AC_VO, AC_VI, AC_BE, and AC_BK, STAs whose UL MU transmission is triggered by the UL MU Poll Confirm frame may transmit traffic having any ACs in a UL MU PPDU to the AP.

Further, UL MU transmission efficiency may be increased by enabling STAs whose UL MU transmission is triggered to determine whether to perform the UL MU transmission before starting to transmit a UL MU PPDU. For example, STAs receiving a UL MU Poll Confirm frame may perform virtual carrier sensing (e.g., NAV check). Only when a channel is idle, the STAs may transmit the UL MU PPDU. On the contrary, if a virtual sensing result of an STA receiving the UL MU Poll Confirm frame indicates a channel idle state, the STA may not participate in transmission of the UL MU PPDU. This is because even though a carrier sensing result of the AP indicates a channel idle state, carrier sensing results of STAs for which UL MU transmission is triggered by the AP may not indicate the channel idle state. If an STA performs UL MU transmission even though a carrier sensing result of the STA indicates a channel busy state, the transmission of the STA may collide with transmission of another STA currently occupying the channel. Therefore, only when a virtual carrier sensing result of each of STAs receiving a frame triggering UL MU transmission (e.g., a UL MU Poll Confirm frame) indicates a channel idle state (e.g., a NAV value is not a non-zero value), the STA may determine that it can perform the UL MU transmission.

Now, a description will be given of a method for indicating or determining a different UL transmission scheme according to information included in a trigger in trigger-based UL transmission.

UL transmission schemes may be classified into UL SU transmission in which one STA transmits a frame to an AP during a specific time period, and UL MU transmission in which a plurality of STAs simultaneously transmit frames to an AP during a specific time period, according to the number of users participating in UL transmission. UL transmission schemes may also be classified into control frame transmission (e.g., transmission of a CTS frame, an ACK frame, or a PS-Poll frame), data frame transmission, and management frame transmission (e.g., transmission of an Association Response frame, a Reassociation Response frame, or a Probe Response frame), according to the type of a transmitted MAC frame.

According to the present disclosure, a UL transmission scheme may be determined according to the type of a trigger in trigger-based UL transmission. For example, a first-type trigger frame may elicit a UL MU control frame (e.g., MU CTS), a second-type trigger frame may elicit a UL SU control frame (e.g., SU CTS), a third-type trigger frame may elicit UL MU transmission (e.g., transmission of UL MU data frames), and a fourth-type trigger frame may elicit UL MU random transmission.

More specifically, the type of a response frame may be determined according to a version of the response frame requested by a trigger frame, the number of STAs to participate in transmission of the response frame, and whether an STA to participate in transmission of the response frame is specified, in trigger-based UL transmission.

For example, different types of response frames may be transmitted for a first version and a second version as versions of a response frame requested by a trigger frame. Specifically, the first version may be an older version than the second version. More specifically, a first-version response frame may be a response frame conforming to a legacy PPDU format (e.g., a PPDU format defined by the IEEE 802.11 a/b/g/n/ac standard, for example, a non-HT PPDU format), and a second-version response frame may be a response frame conforming to the afore-described HE PPDU format.

Further, if the trigger frame requests a first-version response frame, a different type of response frame may be transmitted depending on whether the trigger frame indicates one STA or one or more STAs. If the trigger frame indicates a first-version response frame from one STA, the indicated one STA may transmit a first-version UL response frame (e.g., a UL SU control frame, specifically a legacy CTS (or SU CTS) frame). On the other hand, if the trigger frame indicates first-version response frames from one or more STAs, the indicated one or more STAs may simultaneously transmit first-version UL response frames (e.g., UL MU control frames, specifically MU CTS frames) simultaneously. That is, a trigger frame eliciting transmission of first-version UL response frames from one or more STAs is referred to as a first-type trigger frame, and a trigger frame eliciting transmission of a first-version UL response frame from one STA is referred to as a second-type trigger frame. For example, the first-type trigger frame may correspond to a UL MU Poll Confirm frame, and first-version UL response frames that a plurality of STAs transmit simultaneously in response to the first-type trigger frame may correspond to legacy CTS frames. The second-type trigger frame may correspond to a frame requesting transmission of a CTS frame from one STA and a first-version UL response frame transmitted in response to the second-type trigger frame by the one STA may correspond to a legacy CTS frame.

Meanwhile, if the trigger frame requests a second-version response frame, a different type of response frame may be transmitted depending on whether the trigger frame indicates one or more STAs (e.g. whether the trigger frame implicitly or explicitly indicates resources for one or more STAs) or whether the trigger frame indicates no STA (e.g., whether the trigger frame does not indicate resources for one or more STAs). If the trigger frame indicates second-version response frames from one or more STAs, the indicated one or more STAs may participate in UL MU transmission (e.g., transmission of UL MU data frames) using resources indicated by the trigger frame. If the trigger frame indicates a second-version response frame without indicating any STA, one or more STAs receiving this trigger frame may participate in UL MU transmission using resources for random access (i.e., resources allowing collision between transmissions of the one or more STAs). That is, a trigger frame eliciting transmission of second-version UL response frames from one or more STAs is referred to as a third-type trigger frame, and a trigger frame eliciting random access-based transmission of second-version UL response frames from one or more STAs is referred to as a fourth-type trigger frame. For example, the third-type trigger frame may correspond to a UL MU Poll Confirm frame, and second-version UL response frames transmitted simultaneously in response to the third-type trigger frame by a plurality of STAs may correspond to a UL MU PPDU frame. The fourth-type trigger frame may correspond to a UL MU Poll Request frame requesting random access of any STA, and a second-version UL response frame transmitted in response to the UL MU Poll Request frame by the STA may correspond to a UL MU Poll Response frame.

For example, STAs which have received a poll frame triggering UL MU transmission (e.g., a UL MU Poll Confirm frame) may provide NAV information around them in order to protect a channel for transmission of a UL MU PPDU from a third-party STA (e.g., an STA of an Overlapping BSS (OBSS), a legacy STA, etc.) that does not listen to the UL MU PPDU. For this purpose, the STAs may transmit CTS frames. These CTS frames may be transmitted in a legacy PPDU (e.g., a NON-HT PPDU or a NON-HT duplicate PPDU) so that all third-party STAs may receive the CTS frames. In this manner, UL MU transmission efficiency can be increased in an OBSS environment by allowing adjacent OBSS STAs to set a NAV value using a trigger-based CTS frame.

If a plurality of STAs transmit CTS frames simultaneously based on a trigger, these CTS frames may correspond to MU CTS frames, and a trigger frame triggering the MU CTS frames may correspond to as an MU RTS frame. If one STA transmits a CTS frame based on a trigger, this CTS frame may correspond to an SU CTS frame and a trigger frame eliciting an SU CTS frame may correspond to an SU RTS frame In addition, CTS frames that STAs transmit in response to a poll frame triggering UL MU transmission (e.g., a UL MU Poll Confirm frame) may be CTS-to-Self frames (i.e., CTS frames each including an RA set to the MAC address of an STA itself).

To allow third-party STAs to successfully receive CTS frames corresponding to legacy PPDUs transmitted simultaneously by a plurality of STAs, MPDUs (i.e., CTS frames) included in PSDUs transmitted by the plurality of STAs may carry the same contents. For example, the same scrambling sequence used for PSDU encoding may be set for all of the plurality of CTS frames. Further, to include the same information in the plurality of CTS frames, the RA fields of the CTS frames may be set to the same value (e.g., the BSSID of the AP), unlike CTS-to-Self frames. In addition, the Frame Control fields, the Duration fields, etc. of the CTS frames may be set to the same values.

Figure 22:
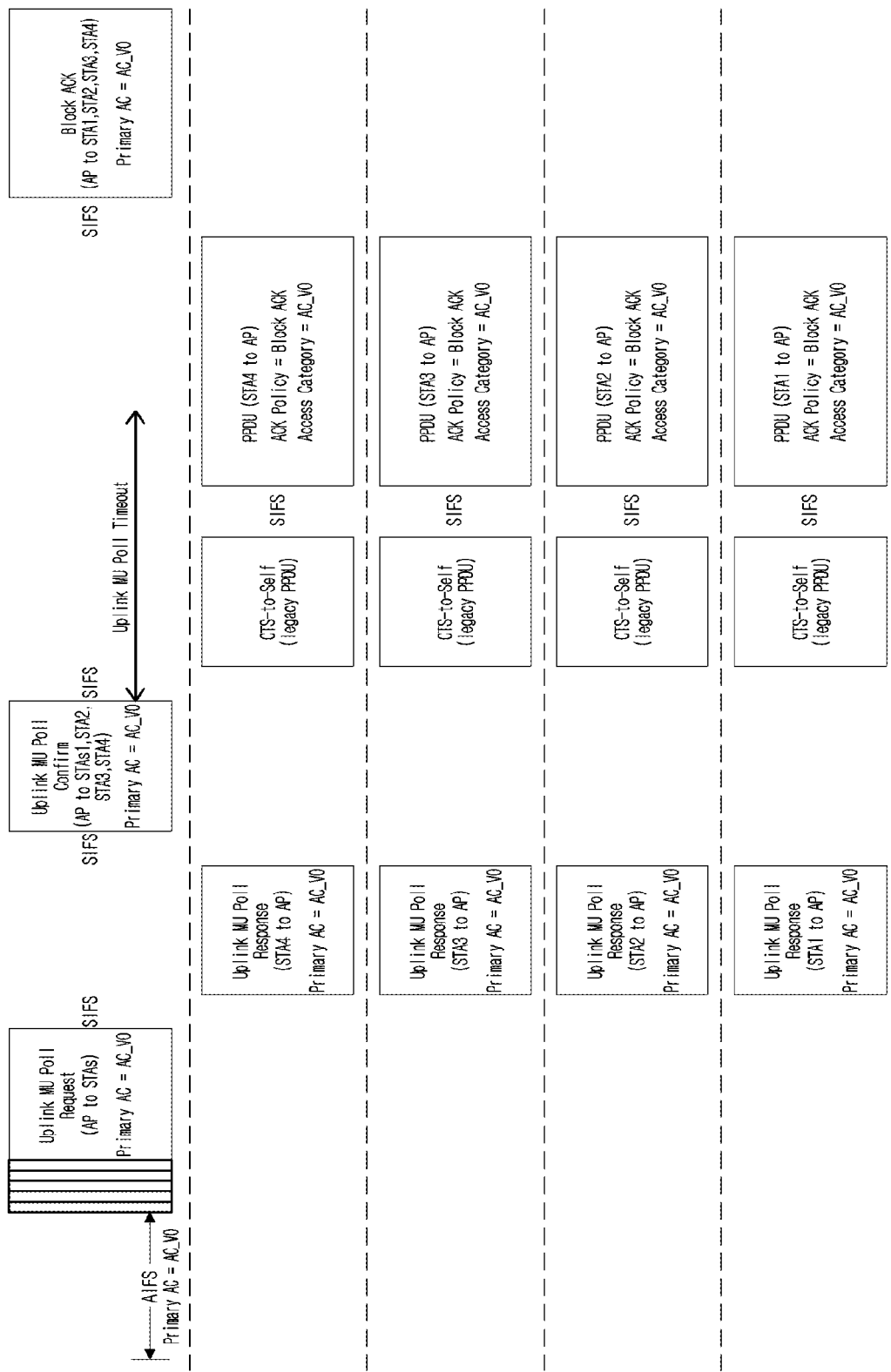
FIG. 22 depicts an exemplary trigger type-based UL transmission scheme according to the present disclosure.

FIG. 22 depicts an exemplary trigger type-based UL transmission scheme according to the present disclosure.

In the example of FIG. 22, the AP may transmit a UL MU Poll Request frame through a random backoff procedure. Among STAs receiving the UL MU Poll Request frame, a plurality of STAs (e.g., STA1, STA2, STA3, and STA4) having traffic corresponding to AC_VO indicated by primary AC information may transmit UL MU Poll Response frames to the AP. Upon receipt of the UL MU Poll Response frames from the plurality of STAs, the AP may request or indicate UL MU transmission to STA1, STA2, STA3, and STA4 by a UL MU Poll Confirm frame.

If the UL MU Poll Confirm frame is a first type (e.g., MU RTS), STA1, STA2, STA3, and STA4 may configure and transmit CTS frames (e.g., CTS-to-Self frames) in a legacy PPDU format before starting to transmit a UL MU PPDU. In this manner, the plurality of STAs may transmit a UL MU PPDU including traffic corresponding to AC_VO an SIFS after transmitting the MU CTS frames simultaneously.

As illustrated in FIG. 22, the transmission times (or lengths) of a plurality of CTS frames may be set to the same value. For this purpose, the seed value of the scrambling sequence, MCS, or rate of a trigger frame (e.g., a UL MU Poll Confirm frame or an MU RTS frame) triggering the plurality of CTS frames that are transmitted simultaneously may be used commonly for transmission of the plurality of CTS frames.

Additionally, transmission of a CTS frame (i.e., an SU CTS frame) from one STA may be elicited by a trigger frame. For example, if the UL MU Poll Confirm frame is a second type (e.g., SU RTS), one of the plurality of STAs may transmit a SU CTS frame.

As described above, a trigger frame requesting CTS frames before transmission of a UL MU PPDU starts may be directed to a plurality of STAs requested for UL MU PPDU transmission (i.e., a first-type trigger frame) or one of STAs requested for UL MU PPDU transmission (i.e., a second-type trigger frame).

Additionally, UL MU data transmission from a plurality of STAs may be elicited by a trigger frame. For example, if the UL MU Poll Confirm frame is the third type, a plurality of STAs may transmit data frames in UL MU. As illustrated in the example of FIG. 22, a plurality of STAs may be requested to transmit a UL MU PPDU in immediate response to a trigger frame (e.g., immediately an SIFS after reception of the trigger frame), rather than they are requested to transmit CTS frames before they start to transmit a UL MU PPDU.

Also, UL random access transmission from one or more STAs may be elicited by a trigger frame. For example, if the trigger frame is the fourth type like a UL MU Poll Request frame, an STA may transmit a UL MU Poll Response frame in random access allowing collision.

In this manner, the AP may request or indicate different types of UL transmission using a trigger frame (e.g., a UL MU Poll Confirm frame). That is, one of MU CTS transmission, SU CTS transmission, UL MU PPDU transmission, and UL random access transmission may be performed according to information included in a trigger frame.

For this purpose, explicit information indicating the type of a trigger frame may be included in the trigger frame so that a UL transmission scheme may be determined based on the information. Or trigger frame types corresponding to trigger frames of a plurality of formats are preset so that when a trigger frame of a specific format is received, a UL transmission scheme may be determined according to a trigger frame type corresponding to the format.

Or a new field indicating whether CTS transmission is requested may be added to a trigger frame. Thus, whether a CTS frame is to be transmitted before transmission of a UL MU PPDU may be indicated. Or information indicating the type of a CTS frame (e.g., information indicating MU CTS or SU CTS) may be added to a trigger frame. If the information does not indicate any CTS type (or the information is reserved), a UL MP PPDU may be transmitted, not preceded by a CTS frame. Or a field indicating whether CTS transmission is requested and information indicating a CTS type (e.g., information indicating MU CTS or SU CTS) may be added to a trigger frame.

Figure 23:
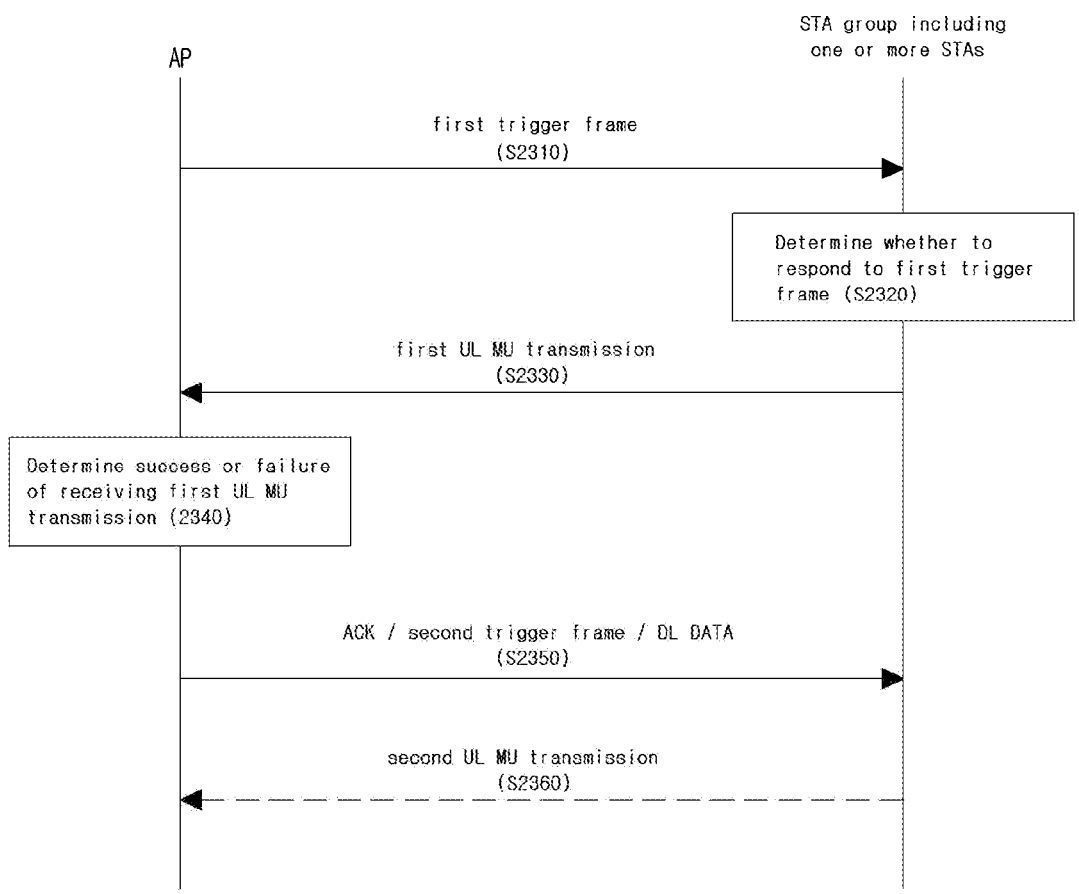
FIG. 23 depicts an exemplary method according to the present disclosure.

FIG. 23 depicts an exemplary method according to the present disclosure.

In step S2310, an AP may transmit a first trigger frame to an STA group (i.e., an STA group including one or more STAs). For example, the first trigger frame may correspond to a poll frame triggering UL MU transmission or a UL MU Poll Request frame for UL MU random access.

In step S2320, each STA of the STA group may determine whether to respond to the first trigger frame based on information included in the first trigger frame. For example, if the first trigger frame corresponds to a poll frame triggering UL MU transmission and includes information requesting UL MU transmission to the STA receiving the poll frame, the STA may determine to perform first UL MU transmission in response to the first trigger frame. Or if the first trigger frame corresponds to a UL MU Poll Request frame for UL MU random access, the STA receiving the UL MU Poll Request frame may determine whether to participate in UL MU random access based on whether a response condition for the UL MU random access is satisfied.

An STA that has determined to respond to the first trigger frame in step S2320 may perform the first UL MU transmission. For example, if the first trigger frame corresponds to a poll frame triggering UL MU transmission, the first UL MU transmission may correspond to transmission of a UL MU PPDU including UL frames from a plurality of STAs. Or if the first trigger frame corresponds to a UL MU Poll Request frame for UL MU random access, the first UL MU transmission may include a UL random access-based UL MU Poll Response frame. The UL random access-based UL MU Poll Response frame may include information indicating that the STA transmitting the UL random access-based UL MU Poll Response frame will participate in UL MU transmission. Or if the STA transmitting the UL random access-based UL MU Poll Response frame is a TIM STA, the UL random access-based UL MU Poll Response frame may include information requesting DL data transmission.

In step S2330, transmissions from all STAs participating in the first UL MU transmission from the STA group may end at the same time point indicated by the first trigger frame. For this purpose, one or more of the STAs participating in the first UL MU transmission may add paddings to their transmitted UL frames.

In step S2340, upon receipt of a UL frame from at least one STA of the STA group performing the first UL MU transmission, the AP may determine that frame exchange initiated by the first trigger is successful. Also, upon receipt of a UL frame without an error from at least one STA of the STA group performing the first UL MU transmission, the AP may determine to transmit a response frame to the first UL MU transmission.

In step S2350, the AP may transmit a DL MU frame to the STA group in response to the first UL MU transmission. The DL MU frame may include at least one of a plurality of units for the plurality of STAs and an additional trigger frame (e.g., a second trigger frame). Each of the units for the plurality of STAs may include at least one of ACK information (e.g., a block ACK frame) for UL transmission from one of the plurality of STAs participating in the first UL MU transmission and a DL data unit for one of the plurality of STAs. In an embodiment, the DL MU frame may include block ACK information for the plurality of STAs and a second trigger frame. The ACK information or the second trigger frame that the AP transmits in response to the first UL MU transmission may be transmitted a specific IFS (e.g., an SIFS) after the ending time of the first UL MU transmission (i.e., the ending time of the first UL MU transmission, indicated by the first trigger frame). Also, the ACK information for the first UL MU transmission and the second trigger frame may be included in one frame and thus simultaneously transmitted. If the first UL MU transmission includes information requesting DL data transmission from TIM STAs, the AP may transmit DL data in response to the information. The DL data may be transmitted in a DL MU PPDU to a plurality of TIM STAs.

In step S2360, only when the frame transmitted in response to the first UL MU transmission by the AP in step S2350 includes a second trigger frame, second UL MU transmission may be performed. That is, an STA that has received the second trigger frame in step S2350 may determine whether UL MU transmission is requested to the STA. If UL MU transmission is requested to the STA, the STA may participate in the second UL MU transmission.

Figure 24:
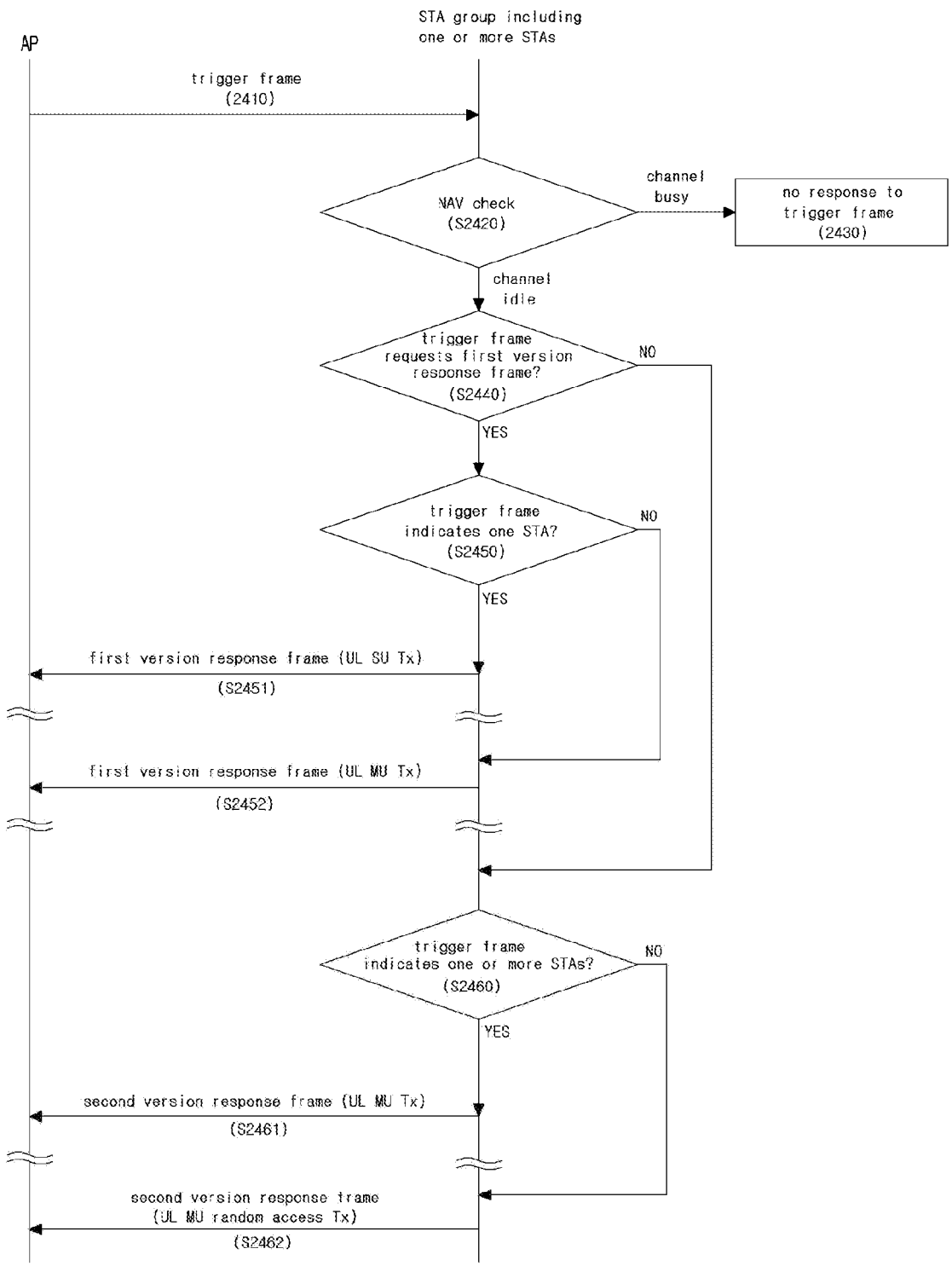
FIG. 24 depicts another exemplary method according to the present disclosure.

FIG. 24 depicts another exemplary method according to the present disclosure.

In step S2410, an AP may transmit a trigger frame to an STA group (i.e., an STA group including one or more STAs). The trigger frame may be a first, second, third, or fourth type. Explicit information indicating the type of the trigger frame may be included in the trigger frame, or the type of the trigger frame may be implicitly indicated according to a predetermined format. Also, the trigger frame may be a first or second trigger frame in the example of FIG. 23.

In step S2420, upon receipt of the trigger frame, an STA may determine whether to respond to the trigger frame by NAV check. For example, if the STA determines that a channel is busy by the NAV check (e.g., a NAV value is a non-zero value), the STA may not respond to the trigger frame in step S2430. Or if the STA determines that the channel is idle by the NAV check (e.g., the NAV value is not a non-zero vale), the STA may determine to respond to the trigger frame in step S2440.

In step S2440, the STA receiving the trigger frame may determine whether the trigger frame requests a first-version response frame or a second-version response frame. The first version may be an older version than the second version. More specifically, the first version may correspond to a legacy PPDU format such as a non-HT version, and the second version may correspond to a HE PPDU format. If the first-version response frame is requested, the STA proceeds to step S2450 and otherwise, the STA may proceed to step S2460.

In step S2450, if the trigger frame indicates one STA, the one STA may transmit a first-version response frame in step S2451. If the trigger frame indicates one STA and does not include resource allocation information, the one STA may transmit the first-version response frame. In this case, the trigger frame corresponds to the afore-described second-type trigger frame. The STA indicated by the second-type trigger frame may transmit the first-version response frame (e.g., an SU legacy control frame, specifically a legacy CTS frame) elicited by the second-type trigger frame in UL SU.

If the trigger frame indicates one or more (e.g., a plurality of) STAs, not just one STA in step S2450, the one or more STAs may transmit first-version response frames in step S2452, as illustrated from exchange between a UL MU Poll Confirm frame and a CTS frame in FIG. 22. If the trigger frame indicates one or more STAs and does not include resource allocation information, the one or more STAs may transmit first-version response frames. In this case, the trigger frame corresponds to the afore-described first-type trigger frame. Also, the first-type trigger frame may be multicast or broadcast. If the first-type trigger frame is multicast, the first-type trigger frame may indicate one group of STAs. If the first-type trigger frame is broadcast, the first-type trigger frame may indicate all STAs receiving the trigger frame. The one or more STAs indicated by the first-type trigger frame may simultaneously transmit first-version response frames (e.g., MU legacy control frames, specifically MU CTS frames) elicited by the first-type trigger frame in UL MU transmission. The whole or part of the first-version response frames may be transmitted in the same resources corresponding to shared resources. The same resources may refer to partially or fully identical time, frequency, and space resources.

On the other hand, if the trigger frame indicates one or more STAs (e.g., dedicated resources are explicitly or implicitly allocated for UL transmission of one or more STAs) in step S2460, the one or more STAs may transmit second-version response frames in the allocated resources as illustrated from exchange between a UL MU Poll Confirm frame and a UL MU PPDU frame in FIG. 21, in step S2461. In this case, the trigger frame corresponds to the afore-described third-type trigger frame. The one or more STAs may simultaneously transmit second-version response frames (e.g., UL MU frames, specifically UL MU data frames) elicited by the third-type trigger frame in UL MU transmission.

If the trigger frame does not indicate one or more STAs and allows transmission of an STA unspecified by the AP in step S2460, one or more unspecified STAs may transmit second-version response frames as illustrated from exchange between a UL MU Poll Request frame and a UL MU Poll Response frame in FIGS. 18 and 19, in step S2462. The one or more STAs may participate in UL MU transmission using random access resources allowing collision. In this case, the trigger frame corresponds to the afore-described fourth-type trigger frame. The one or more STAs may simultaneously transmit second-version response frames (e.g., UL MU frames, specifically UL MU data frames) elicited by the fourth-type trigger frame using random access resources allowing collision.

As described above, a different UL transmission scheme or a different UL transmission frame type may be determined according to the type of a trigger frame.

While the exemplary method has been described with reference to FIG. 23 or FIG. 24 as a series of operations for simplicity of description, this does not limit the sequence of steps. When needed, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the method of FIG. 23 or FIG. 24.

The present disclosure includes an apparatus for processing or performing the method of the present disclosure (e.g., the wireless device and its components described with reference to FIGS. 1, 2, and 3).

The present disclosure includes software (an operating system (OS), an application, firmware, a program, etc.) for executing the method of the present disclosure in a device or a computer, and a medium storing the software that can be executed in a device or a computer.

While various embodiments of the present disclosure have been described in the context of an IEEE 802.11 system, they are applicable to various mobile communication systems.

What is claimed is:

1. A method for transmitting an uplink frame by a station (STA) to an access point (AP) in a wireless local area network, the method comprising:
receiving from the AP a trigger frame for eliciting an uplink transmission from the STA;
transmitting to the AP the uplink frame according to a type of the trigger frame, wherein when the uplink frame is transmitted in an uplink multiple user (MU) transmission, the uplink frame includes a padding added by the STA such that transmissions from a plurality of STAs including the STA in the uplink MU transmission end at a same time indicated by the trigger frame; and
receiving from the AP a frame in response to the uplink MU transmission a predetermined time after an end of the uplink MU transmission,
wherein the frame received in response to the uplink MU transmission includes both acknowledgment (ACK) information for the uplink MU transmission and another trigger frame for eliciting another uplink MU transmission, the other trigger frame including scheduling information for the other uplink MU transmission.

2. The method according to claim 1, wherein a length of the padding is determined based on information on a transmission time of the uplink MU transmission included in the trigger frame.

3. The method according to claim 1, wherein the STA receives the frame in response to the uplink MU transmission a SIFS (Short Inter-Frame Space) time after the end of the uplink MU transmission.

4. The method according to claim 1, wherein the AP determines that the uplink MU transmission is successfully received, when the AP receives an uplink frame from at least one STA among the plurality of STAs.

5. The method according to claim 4, wherein the frame including the ACK information is transmitted by the AP, when a physical layer of the AP indicates that an uplink frame from at least one STA among the plurality of STAs is received with no error.

6. The method according to claim 1, wherein the STA transmits an uplink frame in the another uplink MU transmission, when the frame received in response to the uplink MU transmission includes another trigger frame for eliciting another uplink MU transmission.

7. The method according to claim 1, wherein an ACK policy of the STA is set to Immediate Block ACK.

8. The method according to claim 1, wherein ACK policies of the plurality of STAs are set to a same value.

9. The method according to claim 1, wherein the trigger frame is broadcast to elicit the uplink MU transmissions from unspecified plurality of STAs, and
the trigger frame includes response condition information used by a STA receiving the trigger frame for determining whether to transmit the uplink frame in response to the trigger frame.

10. The method according to claim 9, wherein the response condition information indicates that a Traffic Indication Map (TIM) STA is allowed to transmit the uplink frame in response to the trigger frame.

11. The method according to claim 10, wherein the uplink frame transmitted by the STA that is a TIM STA indicates that the STA requests a downlink frame for the STA buffered at the AP,
the frame received in response to the uplink MU transmission includes the downlink frame for the STA buffered at the AP, and
the downlink frame is included in a downlink MU Physical layer Protocol Data Unit (PPDU).

12. The method according to claim 9, wherein the response condition information indicates that a STA having an uplink traffic having a specific access category is allowed to transmit the uplink frame in response to the trigger frame.

13. The method according to claim 1, wherein the STA checks a network allocation vector (NAV) before transmitting the uplink frame, and transmits the uplink frame when a channel is idle according to the NAV.

14. The method according to claim 1, the STA transmits the uplink frame including a control frame in the uplink MU transmission when the type of the trigger frame is a first type.

15. The method according to claim 1, the STA transmits the uplink frame including a control frame in an uplink single user (SU) transmission when the type of the trigger frame is a second type.

16. The method according to claim 1, the STA transmits the uplink frame including a data frame in the uplink MU transmission when the type of the trigger frame is a third type.

17. A method for receiving an uplink transmission by an access point (AP) in a wireless local area network, the method comprising:
transmitting a trigger frame for eliciting the uplink transmission from one or more STAs;
receiving from the one or more STAs the uplink transmission according to a type of the trigger frame, wherein when the uplink transmission is an uplink multiple user (MU) transmission, each of at least one uplink frame includes a padding added by a STA of a plurality of STAs such that transmissions from the plurality of STAs in the uplink MU transmission end at a same time indicated by the trigger frame; and
transmitting a frame in response to the uplink MU transmission a predetermined time after an end of the uplink MU transmission,
wherein the frame in response to the uplink MU transmission includes both acknowledgment (ACK) information for the uplink MU transmission and another trigger frame for eliciting another uplink MU transmission, the other trigger frame including scheduling information for the other uplink MU transmission.

* * * * *